US008824355B2

(12) United States Patent
Takano

(10) Patent No.: US 8,824,355 B2
(45) Date of Patent: Sep. 2, 2014

(54) COMMUNICATION SYSTEM, COMMUNICATION APPARATUS, COMMUNICATION METHOD AND COMPUTER PROGRAM PRODUCT

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 13/377,718

(22) PCT Filed: Aug. 10, 2010

(86) PCT No.: PCT/JP2010/005008
§ 371 (c)(1),
(2), (4) Date: Dec. 12, 2011

(87) PCT Pub. No.: WO2011/018892
PCT Pub. Date: Feb. 17, 2011

(65) Prior Publication Data
US 2012/0082087 A1    Apr. 5, 2012

(30) Foreign Application Priority Data

Aug. 10, 2009  (JP) ................................. 2009-185406
Jul. 1, 2010    (JP) ................................. 2010-151415

(51) Int. Cl.
*H04B 7/14*    (2006.01)
(52) U.S. Cl.
CPC .................................. *H04B 7/1557* (2013.01)
USPC ........... 370/315; 370/329; 370/338; 370/341; 370/347
(58) Field of Classification Search
CPC .................................................. H04B 7/15557
USPC .......... 370/280, 315, 319, 321, 326; 455/442, 455/452.2
See application file for complete search history.

(56) References Cited

U.S. PATENT DOCUMENTS 7,477,695 B2    1/2009  Takano
7,620,114 B2    11/2009  Takano
(Continued)

FOREIGN PATENT DOCUMENTS

JP         2008 22558        1/2008
WO         2008 146469       12/2008

OTHER PUBLICATIONS

3GPP TSG RAN WG1 #55 R1-084446, "Decode and Forward Relays for E-UTRA enhancements," Texas Instruments, pp. 1-5, (Nov. 14, 2008).

(Continued)

*Primary Examiner* — Brian D Nguyen
*Assistant Examiner* — Toan Nguyen
(74) *Attorney, Agent, or Firm* — Oblon, Spivak, McClelland, Maier & Neustadt, L.L.P.

(57) ABSTRACT

A relay node (or relay station) operates as an intermediary entity in a transmission between a base station and a mobile station based on its position in a cell and the mobile station's position in the cell. Since the cell is divided into multiple regions and different wireless resources are used in the multiple regions, the relay node employs the relevant wireless resources to be used in the communications based on positions of the relay node and the mobile station. When the relay station and the mobile station are both in the boundary region, it is possible to avoid interference in the relay station by adapting a relay mode that uses a boundary frequency avoiding interference with adjacent cells for both an uplink and a downlink and demultiplexes a relay link and an access link in a time direction for each of the uplink and the downlink. Similar adaptations are made when the mobile station and the relay station are in various positions within a center cell region and boundary cell region.

17 Claims, 17 Drawing Sheets

(56) References Cited

U.S. PATENT DOCUMENTS

| | | |
|---|---|---|
| 7,627,045 B2 | 12/2009 | Takano |
| 7,680,461 B2 | 3/2010 | Takano |
| 8,000,421 B2 | 8/2011 | Takano et al. |
| 8,259,644 B2 * | 9/2012 | Choi et al. .................... 370/321 |
| 8,428,608 B2 * | 4/2013 | Liu et al. .................... 455/452.2 |
| 2005/0141631 A1 | 6/2005 | Takano |
| 2006/0193280 A1 * | 8/2006 | Lee et al. .................... 370/315 |
| 2008/0081626 A1 * | 4/2008 | Choi et al. .................... 455/442 |
| 2009/0059819 A1 * | 3/2009 | Choi et al. .................... 370/280 |
| 2010/0172284 A1 | 7/2010 | Horiuchi et al. |

OTHER PUBLICATIONS

3GPP TSG RAN WG1 #55bis meeting R1-090040, "Discussion on frame structure for elay," Mitsubishi Electric, pp. 1-4, (Jan. 16, 2009).
International Search Report Issued Nov. 16, 2010 in PCT/JP10/05008 Filed Aug. 10, 2010.
U.S. Appl. No. 13/389,617, filed Feb. 9, 2012, Takano.
U.S. Appl. No. 13/390,612, filed Feb. 15, 2012, Takano.
U.S. Appl. No. 13/319,098, filed Nov. 7, 2011, Takano.

* cited by examiner

COMMUNICATION SYSTEM, COMMUNICATION APPARATUS, COMMUNICATION METHOD AND COMPUTER PROGRAM PRODUCT

TECHNICAL FIELD

The present invention relates to a communication system, a communication apparatus, a communication method and a computer program product in which a base station communications with a mobile station within a cell through the mediation of a relay station. In particular, the present invention relates to a communication system, a communication apparatus, a communication method and a computer program product which employ a relay mode that applies intercell interference coordination.

BACKGROUND ART

Communication services become increasingly diverse with widespread use of information processing and information communication technology and in particular, development of mobile communication such as mobile phone is remarkable. Currently, 3GPP (Third Generation Partnership Project) is working on standardization of the world standard "IMT (International Mobile Telecommunications)-2000" of a third-generation (3G) mobile communication system drafted by ITU (International Telecommunication Union). "LTE (Long Term Evolution)", which is one of data communication specifications drafted by 3GPP, is a long-term advanced system aimed at fourth-generation (4G) IMT-Advanced and is also called "3.9G (super 3G)".

LTE is a communication mode based on an OFDM (Orthogonal Frequency Division Multiplexing) modulation method and adopts OFDMA (OFDM access) as the radio access method of a downlink. (Down-bound radio access from a base station (BS) toward a mobile station (MS) is called herein as a "downlink" and up-bound radio access from the MS to the BS as an "uplink").

OFDM is a multi-carrier method by which a plurality of pieces of data is assigned to frequency sub-carriers that are "orthogonal", that is, do not interfere with each other and can convert each sub-carrier on a frequency axis into a signal on a time axis for transmission by performing inverse FFT (Fast Fourier Transform) for each sub-carrier. Transmission data is transmitted by being distributed to a plurality of carriers whose frequencies are orthogonal and thus, OFDM is characterized in that the band of each carrier becomes a narrow band, the efficiency of frequency utilization is very high, and delay distortion (frequency selective fading disturbance) is resisted thanks to multi paths.

OFDMA (Orthogonal Frequency Division Multiple Access) is a multiple access scheme in which, instead of all sub-carriers of an OFDM signal being occupied by one communicating station, a set of sub-carriers in the frequency axis is assigned to a plurality of communicating stations so that sub-carriers are shared by the plurality of communicating stations.

3GPP supports a bandwidth close to 100 MHz in a standard specification "LTE-Advanced", which is a further development of LTE for a fourth-generation mobile communication system, and aims for realization of the peak speed of 1 Gbps at the maximum. A space division multiple access scheme in which radio resources on spatial axes are shared by a plurality of users like, for example, multi-user MIMO (MU-MIMO) or SDMA (Space Division Multiple Access) is regarded as very likely.

Moreover, relay technology is examined for LTE-Advanced to improve throughput at cell edges. The relay technology here is a mechanism by which a relay station (RS) is installed in an area of a base station connected to a core network to allow hopping communication between the base station and the relay station. If the communication speed is 1-2 Mbps or so, the modulation method such as BPSK (Binary Phase Shift Keying) and QPSK (Quadrature PSK) can be applied and a necessary SNR (Signal-to-Noise Ratio) is permitted even if the SNR is low. In contrast, to obtain the communication speed of 100 Mbps or more, it is necessary to maintain a high SNR throughout the cell. Moreover, a higher operating frequency increases transmission losses and is sensitive to fading so that a coverage area of a base station deteriorates. Performance of a single base station falls at cell edges and a relay station compensates therefore.

In a downlink, the relay station first amplifies a received signal from a base station and then transmits the received signal to a mobile station. With a received signal being relayed by a relay station, the SNR can be increased when compared with a case when a signal is directly transmitted from the base station to the mobile station. In an uplink, on the other hand, the relay station can maintain the SNR high by receiving a signal from the mobile station and transmitting the signal to the base station.

For example, a cellular system in which the base station assigns resources to terminals, transmits a downlink signal in the current time slot, and receives an uplink signal from terminals via a relay station in the next time slot, the relay station receives a downlink signal from the base station and an uplink signal from terminals in the current time slot and transmits the received downlink signal to the terminals and the received uplink signal to the base station in the next time slot, and the terminal transmits an uplink signal in the current time slot and receives a downlink signal via the relay station in the next time slot (see, for example, Japanese Patent Application Laid-Open No. 2008-22558).

The mode in which a relay station relays a signal between a base station and a mobile station can be classified into the following two types based on how a received signal is transmitted.

The first type is a mode called "Amplify-and-Forward (AF)" in which a relay station retransmits a received signal from a base station after amplifying the signal unchanged as an analog signal. In the AF mode, it is difficult for the mobile station to improve the SNR (Signal-to-Noise Ratio) and thus, it is necessary for the relay station to relay by using a region in which signal strength is sufficiently large. Moreover, there is a feedback path between a transmitting antenna and a receiving antenna so that consideration must be given to prevention of oscillation. An advantage of the AF mode is that there is no need at all to improve the communication protocol.

The second type is a mode called "Decode-and-Forward (DF)" in which the relay station performs digital processing on a received signal from the base station and then amplifies and transmits the received signal. That is, the relay station converts the received signal from the base station into a digital signal by the AD conversion, performs decode processing such as an error correction on the signal, encodes the signal again, and converts the signal into an analog signal by the DA conversion before amplifying and transmitting the signal. According to the DF mode, the SNR can be improved by a coding gain. Further, an issue of a signal turnaround into between the transmitting antenna and the receiving antenna can be avoided by a signal converted into a digital signal being stored in a memory and the signal being transmitted in the next time slot by the relay station. Oscillation can also be suppressed by changing the frequency, instead of the time slot being changed for transmission and reception.

In LTE-Advanced, which is a future network of 3GPP, the DF mode capable of improving the SNR rather than the AF mode is more likely to be used.

In LTE and LTE-Advanced, a reduction in communication delay is demanded and more specifically, reducing the delay between users to 50 millisecond or less is demanded. Thus, when relay technology is introduced, an issue of delay caused by the mediation of a relay station needs to be sufficiently considered.

While the DF-type relay mode improves the SNR by a coding gain, a delay caused by decoding and recoding is significant. Thus, a method by which the AF type that causes less delay is used for channels in which a delay demand is severe and the DF type is applied to channels in which a delay demand is not severe is proposed.

If relayed in the DF type relay mode by changing the time slot by time division to avoid interference, the delay increases in time slot. The delay when a relay station recodes and transmits a received signal is frequently aligned with a delay of one subframe or time slot. This is because if a relay station should be introduced while maintaining downward compatibility of LTE, such delimitation is easier to maintain compatibility. One subframe is a delimiter of an uplink and a downlink of TDD (Time Division Duplex) and thus is easier to adopt as the unit of delay of a relay station.

In LTE, intercell interference coordination (ICIC) is proposed to reduce an influence of interference between adjacent cells of the same channel.

The ICIC can be realized by, for example, a fractional frequency repetition combining a one-cell frequency repetition and a multi-cell frequency repetition.

Each cell is divided into a center region inside the cell close to a base station and a boundary region at cell ends apart from the base station. While a "central frequency" assigned to communication between the base station and the mobile station in the center region competes with that of adjacent cells (that is, a one-cell frequency repetition), interference between cells is avoided by controlling transmission power small enough so that a signal reaches only within the center region. On the other hand, it is necessary to transmit a signal large enough so that the signal reaches the boundary region and interference between cells is avoided by mutually different "boundary frequencies" being used by boundary regions of adjacent cells (that is, a multi-cell frequency repetition). Moreover, instead of all sub-carriers of an OFDM signal being occupied by one mobile station, sub-carriers of the central frequency are assigned to mobile stations near the base station and those of boundary frequencies to mobile stations apart from the base station so that sub-carriers are shared by a plurality of mobile stations to implement multiple access (OFDMA).

If relay technology is introduced into a cellular system, each link is to be demultiplexed in terms of the time and frequency to prevent a reception from the base station (a relay link) and a retransmission to the mobile station (an access link) of the relay station from interfering with each other or to prevent an uplink and a downlink from interfering with each other. When intercell interference coordination (fractional frequency repetition) is performed, the frequency is different depending on the position even in the same cell (using either the central frequency or the boundary frequency) and it is necessary to take this point into consideration to avoid interference between links.

If relay technology is introduced, intercell interference coordination is also necessary to be taken into consideration.

CITATION LIST

Patent Literature

PTL 1: Japanese Patent Application Laid-Open No. 2008-22558

SUMMARY OF INVENTION

Technical Problem

Thus, it is desirable to provide a communication system, a communication apparatus, a communication method and a computer program product which are superior, and in which a base station can suitably communicate with a mobile station in a cell through the mediation of a relay station.

It is also desirable to provide a communication system, a communication apparatus, a communication method and a computer program product which employ a superior relay mode capable of suitably performing intercell interference coordination.

It is also desirable to provide a communication system, a communication apparatus, a communication method and a computer program product which are capable of suitably relaying between the base station and a mobile station so as to avoid interference in the relay station between the relay link and the access link, or the uplink and the downlink, using intercell interference coordination.

Solution to Problem

The present invention addresses the above-identified and other limitations of conventional systems, methods and computer program product, as will be discussed in detail herein.

One such system is a mobile communication system that includes a base station and a relay node. The base station includes a transmitter that provides wireless coverage in a cell, the cell being divided into a center region and a boundary region, the center region being surrounded by the boundary region, an outer edge of the boundary region defining an outer edge of the cell, the transmitter transmits using first wireless resources allocated to the center region and second wireless resources allocated to the boundary region. The relay node is configured to relay signals between said base station and said mobile station, and includes a controller that operates the relay node in one of a plurality of relay modes that are distinguished based on position information of the mobile station and position information of the relay node, respective of the plurality of relay modes having predetermined wireless resource assignments for communications between the base station and relay node, and between the relay node and mobile station.

In this system, a plurality of relay modes respectively define wireless resources and times to be used when providing an access link from the mobile station to the relay node, and a relay link from the relay node to the base station.

Likewise, the controller may set the relay mode to be one of a first relay mode when the relay node is in the center region and the mobile station is in the boundary region, a second relay mode when both the relay node and the mobile station are in the boundary region, or a third relay mode when both the relay node and the mobile station are in the center region, wherein the transmitter when using the first wireless resources to cover the center region transmits at a lower power than when using second wireless resources to cover the boundary region.

The second relay mode and third relay mode may use mutually exclusive frequency bands, and the first relay mode uses combined time division and frequency division multiple access, wherein each of an uplink and a downlink employ mutually exclusive frequency bands.

The first relay mode employs at least one of a set of frequency and time combinations. The combinations may include:
  employing one of the mutually exclusive frequency bands for the uplink during a first time segment, and another of the mutually exclusive frequency bands for the downlink during a second time segment, the first time segment not overlapping the second time segment;
  employing the one of the mutually exclusive frequency bands for the uplink during the first time segment, and another of the mutually exclusive frequency bands for the downlink during the second time segment, the first time segment not overlapping the second time segment; and
  employing a first sub-band of the one of the mutually exclusive frequency bands for a relay link portion of the uplink and employing a first sub-band of the another of the mutually exclusive frequency bands for an access link portion of the uplink, and
  employing a second sub-band of the one of the mutually exclusive frequency bands for a relay link portion of the downlink and employing a second sub-band of the another of the mutually exclusive frequency bands for an access link portion of the downlink.

The mobile communication system may optionally include a position determination mechanism configured to determine the position information of the relay node, the position determination mechanism being included in one of the relay node and the base station.

The inventive system may also be embodied as a relay node in a mobile communication system that provides wireless coverage in a cell of a base station, the cell being divided into a center region and a boundary region, the center region being surrounded by the boundary region. The relay node includes a transceiver configured to relay signals between the base station and the mobile station. The relay node also includes a controller that operates the relay node in one of a plurality of relay modes, the plurality of relay modes being distinguishable based on position information of the mobile station and position information of the relay node, respective of the plurality of relay modes having predetermined wireless resource assignments for communications between the base station and relay node, and between the relay node and mobile station.

With regard to the relay node, the plurality of relay modes respectively define wireless resources and times to be used when providing an access link from the mobile station to the relay node, and a relay link from the relay node to the base station.

A second relay mode and a third relay mode use mutually exclusive frequency bands, and a first relay mode uses combined time division and frequency division multiple access, wherein each of an uplink and a downlink employ mutually exclusive frequency bands.

The first relay mode employs at least one of a set of frequency and time combinations, the combinations including:
  employing one of the mutually exclusive frequency bands for the uplink during a first time segment, and another of the mutually exclusive frequency bands for the downlink during a second time segment, the first time segment not overlapping the second time segment;
  employing the one of the mutually exclusive frequency bands for the uplink during the first time segment, and another of the mutually exclusive frequency bands for the downlink during the second time segment, the first time segment not overlapping the second time segment; and
  employing a first sub-band of the one of the mutually exclusive frequency bands for a relay link portion of the uplink and employing a first sub-band of the another of the mutually exclusive frequency bands for an access link portion of the uplink, and employing a second sub-band of the one of the mutually exclusive frequency bands for a relay link portion of the downlink and employing a second sub-band of the another of the mutually exclusive frequency bands for an access link portion of the downlink.

An innovative method according to the present invention relays wireless signals in a cell, the cell being divided into a center region and a boundary region, the center region being surrounded by the boundary region, an outer edge of the boundary region defining an outer edge of the cell, the method including:
  transmitting signals from a base station using wireless resources allocated to the center region and transmitting signals using wireless resources allocated to the boundary region, and
  relaying signals with a relay node between the base station and the mobile station, the relaying step including selecting with a controller a relay mode from a plurality of relay modes based on position information of the mobile station and position information of the relay node, respective of the plurality of relay modes having predetermined wireless resource assignments for communications between the base station and relay node, and between the relay node and mobile station.

The plurality of relay modes respectively define wireless resources and times to be used when providing an access link from the mobile station to the relay node, and a relay link from the relay node to the base station.

The plurality of relay modes include a first relay mode when the relay node is in the center region and the mobile station is in the boundary region, a second relay mode when both the relay node and the mobile station are in the boundary region, and a third relay mode when both the relay node and the mobile station are in the center region, wherein the transmitter when using the first wireless resources to cover the center region transmits at a lower power than when using second wireless resources to cover the boundary region.

The second relay mode and a third relay mode use mutually exclusive frequency bands; and a first relay mode uses combined time division and frequency division multiple access, wherein each of an uplink and a downlink employ mutually exclusive frequency bands. The first relay mode employs at least one of a set frequency and time combinations, the combinations including:
  employing one of the mutually exclusive frequency bands for the uplink during a first time segment, and another of the mutually exclusive frequency bands for the downlink during a second time segment, the first time segment not overlapping the second time segment;
  employing the one of the mutually exclusive frequency bands for the uplink during the first time segment, and another of the mutually exclusive frequency bands for the downlink during the second time segment, the first time segment not overlapping the second time segment; and employing a first sub-band of the one of the mutually exclusive frequency bands for a relay link portion of the uplink and employing a first sub-band of the another of the mutually exclusive frequency bands for an access link portion of the uplink, and employing a second sub-band of the one of the mutually exclusive frequency bands for a relay link portion of the downlink and employing a second sub-band of the another of the mutually exclusive frequency bands for an access link portion of the downlink.

The method may also include determining the position information of the relay node, the position determination mechanism being included in one of the relay node and the base station.

The innovation may also be implemented in a mobile terminal for use in a mobile communication system that provides wireless coverage in a cell from a base station, the cell being divided into a center region and a boundary region, the center region being surrounded by the boundary region, the mobile terminal including:
- a transceiver configured to exchange wireless signals with a base station via a relay node;
- a non-transitory computer readable medium that holds scheduling information corresponding to a selected relay mode for the relay node; and
- a controller configured to change which wireless resources are used in communications with the relay node based on the selected relay mode, the relay mode selected based on position information of the mobile station and position information of the relay node, respective of the plurality of relay modes having predetermined wireless resource assignments for communications between the base station and relay node, and between the relay node and mobile station.

The controller may be configured to selectably operate in a first relay mode, second relay mode or third relay mode,
- the first relay mode being selected when the relay node is in the center region and the mobile station is in the boundary region,
- the second relay mode being selected when both the relay node and the mobile station are in the boundary region, and
- the third relay mode being when both the relay node and the mobile station are in the center region.

The innovation may also be implemented in a base station in a mobile communication system that provides wireless coverage in a cell, the cell being divided into a center region and a boundary region, the center region being surrounded by the boundary region, the base station includes a transceiver and controller. The transceiver is configured to exchange signals with a mobile station via a relay node. The controller selects a relay mode from a plurality of relay modes, the plurality of relay modes being distinguishable based on position information of the mobile station and position information of the relay node, respective of the plurality of relay modes having predetermined wireless resource assignments for communications between the base station and relay node, and between the relay node and mobile station.

The plurality of relay modes respectively define wireless resources and times to be used when providing an access link from the mobile station to the relay node, and a relay link from the relay node to the base station.

Advantageous Effects of Invention

According to the embodiments of the present invention described above, it is possible to provide a communication system, a communication apparatus, a communication method, and a computer program product which employ a superior relay mode capable of suitably performing intercell interference coordination.

Further, according to the embodiments of the present invention described above, it is possible to provide a communication system, a communication apparatus, a communication method, and a computer program product which are superior, and which are capable of suitably relaying by a relay mode corresponding to a position where a relay station is located in a cell while applying a fractional frequency repetition as intercell interference coordination.

Interference in the relay station between an uplink and a downlink as well as between a relay link and an access link can be avoided by deciding a suitable relay mode in the relay station in accordance with each piece of information on position for the relay station and the mobile station.

Interference in the relay station between an uplink and downlink as well as between a relay link and an access link can be avoided by deciding the more suitable relay mode in the relay station considering communication capabilities of the relay station in addition to each piece of information on position of the relay station and the mobile station.

It is possible to offer a relay between the base station and the mobile station by a suitable relay mode by which a relay link and an access link do not interfere with each other in the relay station in accordance with each piece of information on position of the relay station and the mobile station.

When the relay station and the mobile station are both in the boundary region, it is possible to avoid interference in the relay station by adapting the relay mode that uses a boundary frequency avoiding interference with adjacent cells for both an uplink and a downlink and demultiplexes a relay link and an access link in a time direction for each of the uplink and the downlink.

When the relay station and the mobile station are both in the center region, it is possible to avoid interference in the relay station by adapting the relay mode that uses a predetermined central frequency and transmission power that does not reach adjacent cells for both an uplink and a downlink and demultiplexes a relay link and an access link in a time direction for each of the uplink and the downlink.

When the relay station is in the center region, but the mobile station is in the boundary region, it is possible to avoid interference in the relay station by the relay mode that uses a predetermined central frequency and transmission power that does not reach adjacent cells for a relay link and a boundary frequency avoiding interference with the adjacent cells for an access link and demultiplexes the relay link and the access link in a time direction for each of an uplink and a downlink multiplexed in the time direction.

When the relay station is in the center region, but the mobile station is in the boundary region and the relay station can perform a transmission/reception operation simultaneously by multiplexing in a frequency direction, it is possible to avoid interference in the relay station by the relay mode that uses a predetermined central frequency and transmission power that does not reach adjacent cells for a relay link and a boundary frequency avoiding interference with the adjacent cells for an access link and multiplexes the relay link and the access link in a time direction for each of an uplink and a downlink demultiplexed in the time direction.

When the relay station is in the center region, but the mobile station is in the boundary region, the relay station can perform a transmission/reception operation simultaneously by multiplexing in a frequency direction, and a system frequency can be divided into frequencies for a downlink and an uplink, it is possible to avoid interference in the relay station by the relay mode that uses a predetermined central frequency and transmission power that does not reach adjacent cells for a relay link and a boundary frequency avoiding interference with the adjacent cells for an access link and multiplexes the relay link and the access link in a time direction for each of an uplink and a downlink multiplexed in the time direction.

It is possible to adaptively correspond to the movement of the mobile station by selecting the relay mode in the relay station for each predetermined radio frame.

Other purposes, features, and advantages of the present invention will become evident by a detailed description based on embodiments of the present invention described below or appended drawings.

DESCRIPTION OF EMBODIMENTS

An embodiment in which the present invention is applied to a mobile communication system such as LTE will be described in detail with reference to drawings.

Figure 1:
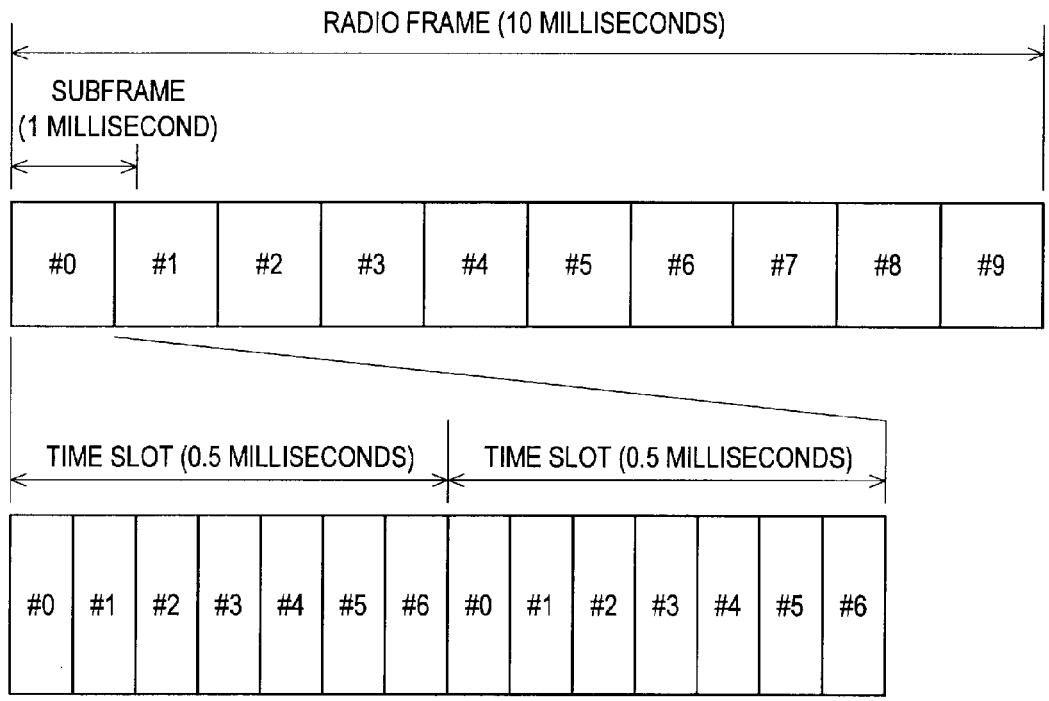
FIG. 1 is a diagram showing a radio frame configuration of a downlink of LTE.

FIG. 1 shows a radio frame configuration of a downlink of LTE. As illustrated in FIG. 1, a radio frame is composed of three hierarchical layers of a time slot (Slot), a subframe (Subframe), and a radio frame (Radio Frame) in descending order of time unit.

A time slot of 0.5 millisecond is constituted by seven OFDM symbols (for normal unicast transmission) and becomes the unit of decode processing when received by a user (mobile station). A subframe of 1 millisecond is constituted by two consecutive time slots and becomes the unit of transmission time of a correction-coded data packet. A radio frame of 10 millisecond is constituted by 10 subframes (that is, 20 time slots) and becomes the basic unit for multiplexing of all physical channels.

Each user can perform communication without mutual interference by using different subcarriers or different time slots. In LTE, the minimum unit of radio resource assignment called a "resource block (RB)" is defined by dividing continuous subcarriers into blocks. One resource block has a width of 12 sub carriers in the frequency axis direction and a length of 0.5 millisecond (seven OFDM symbols) in the time axis direction. A scheduler mounted on a base station assigns radio resources to each user in resource blocks. This assignment is specified in a control channel called "L1/L2 control signaling". Each user recognizes resource blocks assigned to the user by viewing the control channel. The resource blocks are assigned for each subframe, that is, at intervals of 1 millisecond.

The time slot of 0.5 millisecond length is the minimum unit of assignment available to each user. The scheduler mounted on a base station assigns time slots that may be used in units of time slots to each user. In LTE, two duplex systems, FDD (Frequency Division Duplex) and TDD (Time Division Duplex), can be selected. In the case of TDD, which of an uplink and a downlink to use can be selected for each subframe.

In a communication system according to the present embodiment, relay technology is introduced for the purpose of improving throughput at cell edges.

Figure 2:
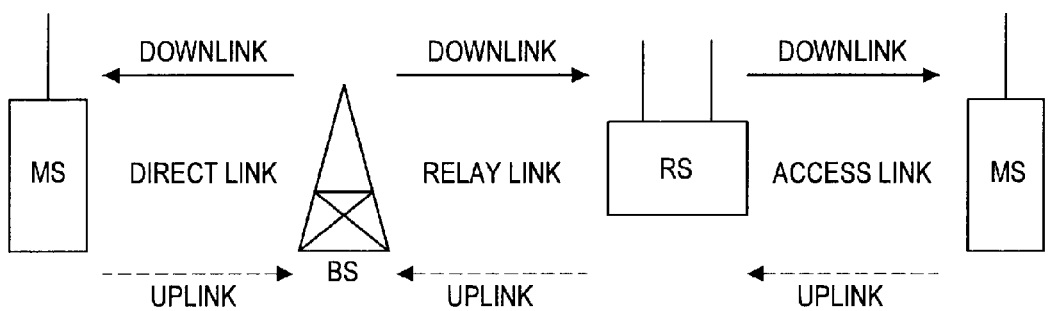
FIG. 2 is a diagram showing a basic communication operation inside a cell including cases when a relay station mediates and does not mediate.

Basic communication operations within a cell including cases when a relay station mediates and does not mediate will be described with reference to FIG. 2. A link between a base station (BS) and a relay station (RS) is called a "relay link (RelayLink)" and a link between the relay station and a mobile station (MS) is called an "access link (AccessLink)". A direct link between the base station and the mobile station without using the relay station is called a "direct link (DirectLink)". In FIG. 2, a downlink is denoted as a solid line arrow and an uplink as a broken line arrow.

In LTE, radio resources are assigned in resource blocks and specified by a control channel called the L1/L2 signaling (mentioned above). A relay station judges whether there is any resource block addressed to the relay station by viewing assignment information of resource blocks in the control channel, that is, scheduling information every 1 millisecond.

In a downlink, the relay station first amplifies a received signal from a base station by, for example, the DF mode (mentioned above) and then transmits the received signal to a mobile station. With a received signal being relayed by a relay station, the Signal-to-Noise Ratio can be increased when compared with a case when a signal is directly transmitted from a base station to a mobile station. In an uplink, on the other hand, the relay station can maintain the Signal-to-Noise Ratio high by receiving a signal from the mobile station and transmitting the signal to the base station after amplifying the received signal.

Further, in a communication system according to the present embodiment, the intercell interference coordination (mentioned above) is applied to reduce an influence of interference between adjacent cells of the same channel.

The intercell interference coordination will be described again here with reference to FIGS. 3A to 3D. In the illustrated example, the intercell interference coordination is realized by a fractional frequency repetition combining a one-cell frequency repetition and a multi-cell frequency repetition (3-cell frequency repetition in FIGS. 3A-3D).

Figure 3A:
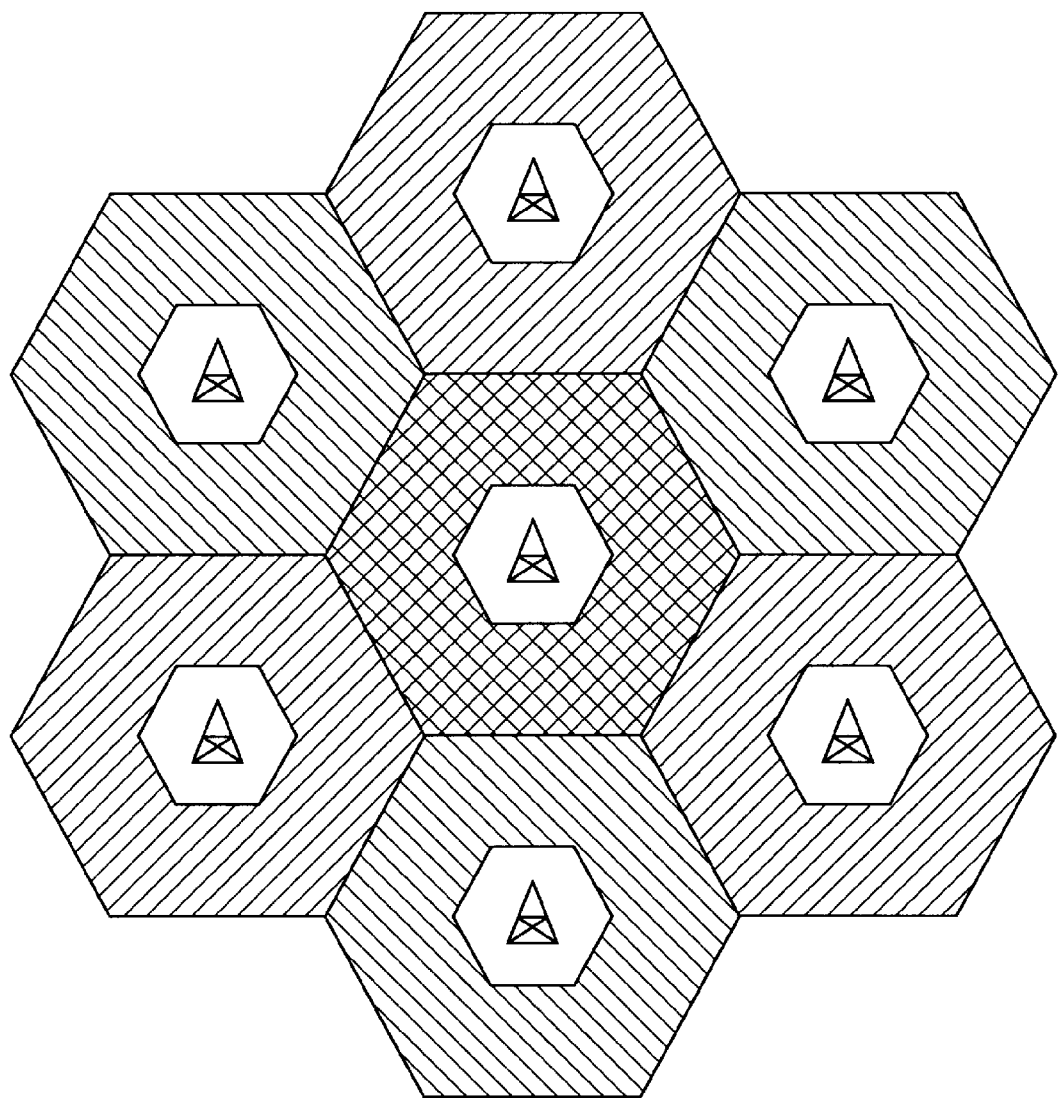
FIG. 3A is a diagram showing a cellular system realizing intercell interference coordination by a fractional frequency repetition.

In FIG. 3A, a hexagon represents one cell range. Each cell is divided into a white center region inside the cell and a shaded boundary region at cell ends. The central frequency assigned to the center region competes with that of adjacent cells (that is, the frequency repetition is 1), but interference between cells is avoided by controlling transmission power small enough so that a signal reaches only within a center region. On the other hand, different frequencies are assigned to boundary regions of adjacent cells (that is, the 3-cell frequency repetition is performed). In FIG. 3A, a difference in frequency band is represented by shading types (positive slopes, negative slopes, and grid-like slashes). By switching allocation of frequency assignment between adjacent cells as illustrated in FIGS. 3B-3D, efficient frequency assignment can be operated.

Figure 3B:
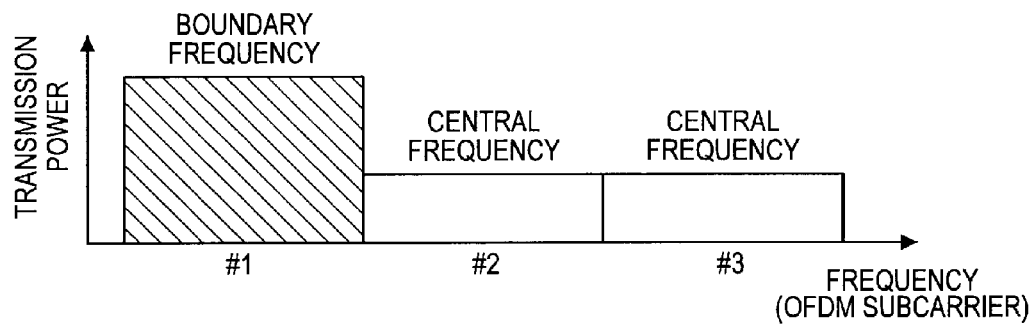
FIG. 3B is a diagram illustrating a frequency assignment inside the cell in which the fractional frequency repetition is performed.
Figure 3C:
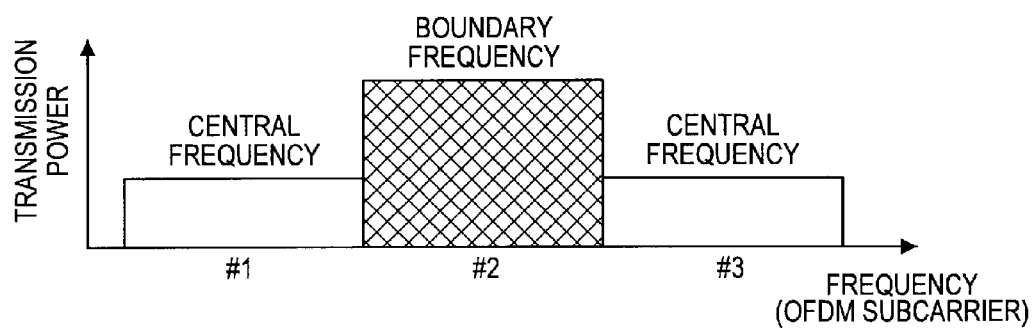
FIG. 3C is a diagram illustrating the frequency assignment inside the cell in which the fractional frequency repetition is performed.
Figure 3D:
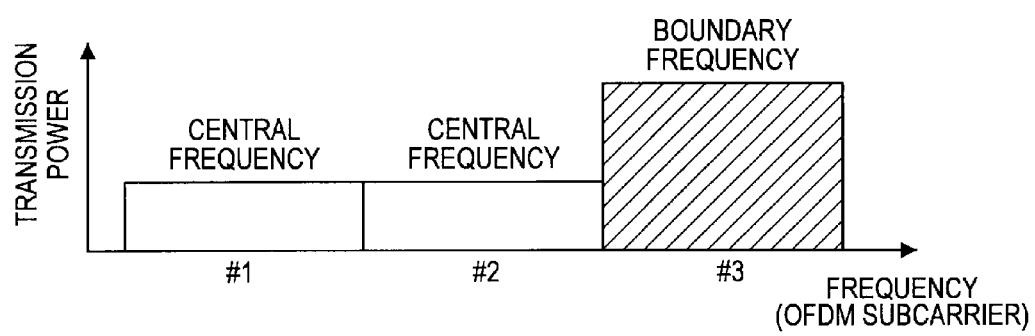
FIG. 3D is a diagram illustrating the frequency assignment inside the cell in which the fractional frequency repetition is performed.

FIGS. 3B to 3D show frequency assignment inside a cell and transmission power. In each cell, the system frequency band is divided into three blocks and a subcarrier block used for frequency repetition between cells is assigned to the boundary frequency and a subcarrier block for 1-cell frequency repetition to the central frequency.

In a cell having a boundary region with negative slopes in FIG. 3A, for example, a subcarrier block #1 is assigned to the boundary frequency and subcarrier blocks #2 and #3 to the central frequency (see FIG. 3B). In a cell having a grid-like shaded boundary region in FIG. 3A, the subcarrier block #2 is assigned to the boundary frequency and the subcarrier blocks #1 and #3 to the central frequency (see FIG. 3C). In a cell having a boundary region with positive slopes in FIG. 3A, the subcarrier block #3 is assigned to the boundary frequency and the subcarrier blocks #1 and #2 to the central frequency (see FIG. 3D). Multiple access (OFDMA) is realized by, instead of all subcarriers of an OFDM signal being occupied by one communicating station, assigning subcarriers of the central frequency to a mobile station or relay station in the center region and sub-carriers of the boundary frequency to a mobile station or relay station in the boundary region to share subcarriers by a plurality of communicating stations.

In any cell in FIG. 3A, inter-cell interference does not occur even if the 1-cell frequency is repeated since transmission power of the central frequency is controlled to a transmission power that is small enough so that a signal reaches only within a center region of the cell. While transmission power of the boundary frequency is large enough so that a radio wave reaches a cell end from the base station in the cell center, interference between adjacent cells does not occur because a frequency repetition of a plurality of cells (three cells in the illustrated example) is used.

Figure 4:
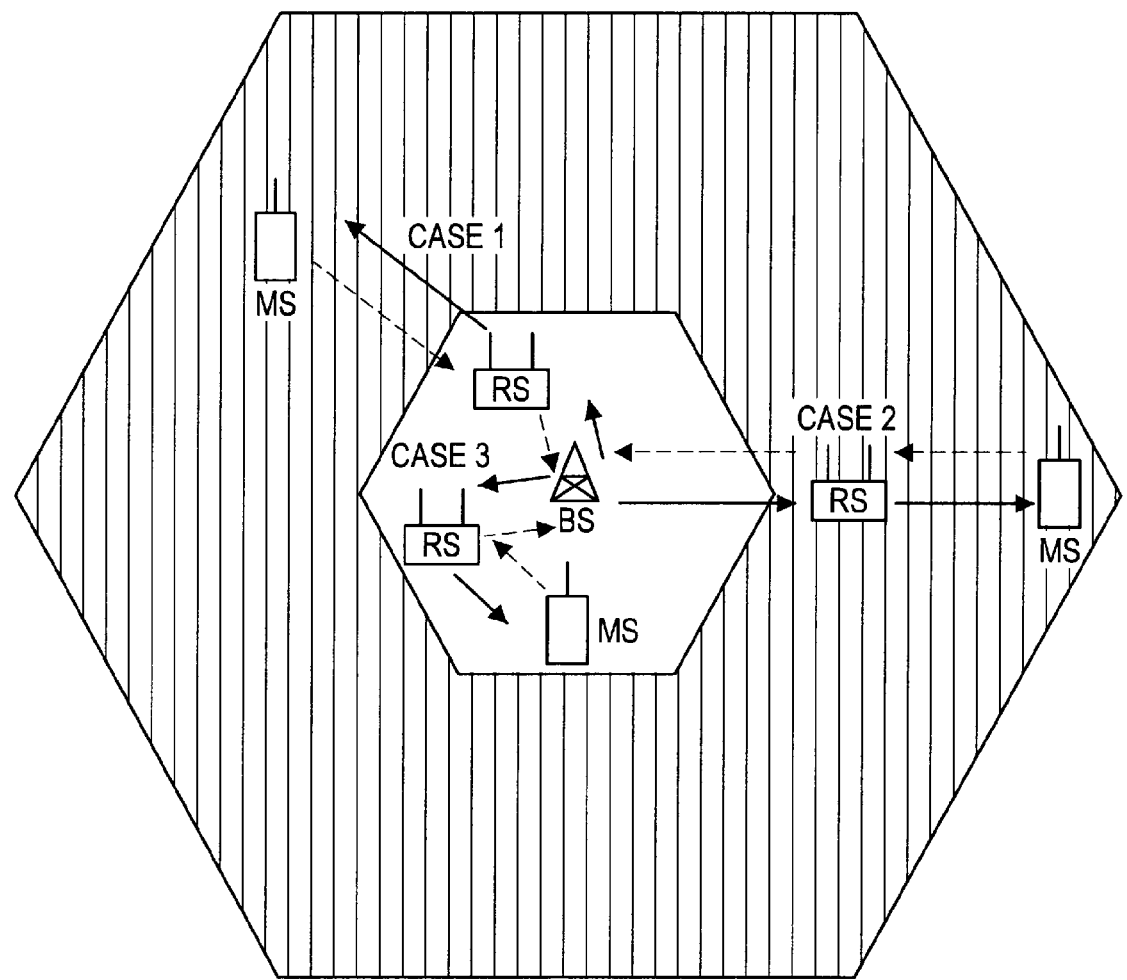
FIG. 4 is a diagram showing a communication example between a base station and mobile stations via relay stations inside the cell in which the intercell interference coordination is applied.

FIG. 4 shows a communication example between a base station and mobile stations via relay stations inside the cell in which the intercell interference coordination is applied. In FIG. 4, a downlink is denoted as a solid line arrow and an uplink as a broken line arrow.

As illustrated in FIG. 4, for each of the relay station and the mobile station, both cases of being located in the center region and the boundary region can be considered. In Case 1 in FIG. 4, a relay station in the center region relays to a mobile station in the boundary region. In Case 2, a relay station and a mobile station belonging thereto are both located in the boundary region. In Case 3, a relay station and a mobile station belonging thereto are both located in the center region.

The relay mode will be considered with reference to FIG. 4. Demultiplexing in terms of the frequency can easily be considered to prevent an uplink and a downlink from interfering with each other in a relay station. Further, demultiplexing in terms of the time slot can easily be considered to prevent a relay link and an access link from interfering with each other in the relay station.

Figure 5:
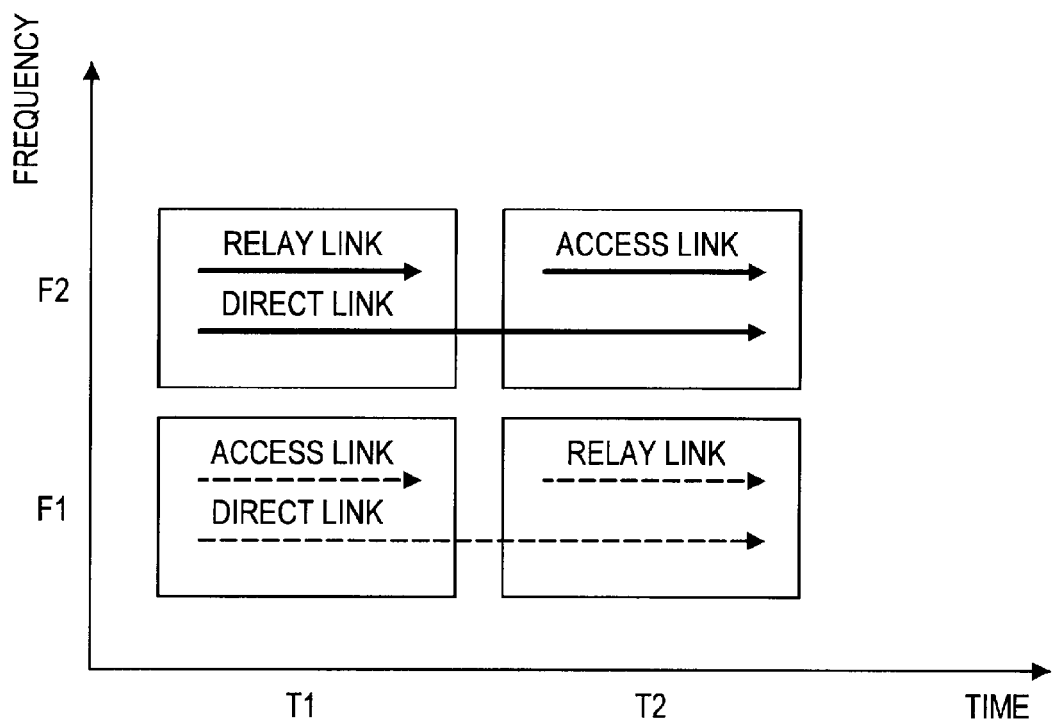
FIG. 5 is a diagram showing how a time slot is demultiplexed in terms of a time and a frequency to prevent a relay link and an access link of the relay station from interfering with each other or to prevent an uplink and a downlink from interfering with each other.

FIG. 5 shows how a time slot is demultiplexed in terms of the time and frequency to prevent a relay link and an access link from interfering with each other or to prevent an uplink and a downlink from interfering with each other in the relay station. In FIG. 5, a solid line arrow denotes a downlink and a broken line arrow an uplink. Each time a relay station is passed through, the time slot is demultiplexed. This is depicted by the smaller arrows in FIG. 5. For a direct link, the time slot can be used continuously, which is depicted as longer arrows in FIG. 5.

The horizontal axis in FIG. 5 is a time axis and the vertical axis is a frequency axis. Each of four squares corresponds to what is called "resource blocks" in LTE and a scheduler mounted in a base station assigns resource blocks. Each resource block can multiplex each channel in the time direction and frequency direction.

During a downlink, a base station transmits a signal by using a resource block of the time slot of time T1 and of a frequency F2 (a relay link of the downlink). A relay station receives the signal in the relay link of the downlink and after storing the signal in a buffer, transmits the signal by using a resource block of the time slot of time T2 and of a frequency F2 (an access link of the downlink). Then, a mobile station receives the signal in the access link of the downlink using the time slot of time T2 and of the frequency F2. Note that the direct link of the downlink is a link to communicate directly from the base station to the mobile station, not through the relay station, but in FIG. 5, it uses the resource block of the frequency F2 successively over the time slots of time T1 and time T2.

During an uplink, on the other hand, a mobile station transmits a signal by using a resource block of the time slot of time T1 and of the frequency F1 (an access link of the uplink) and a relay station receives the signal. Then, the relay station receives the signal in the access link of the uplink and after buffering the signal, transmits the signal by using a resource block of the time slot of time T2 and of the frequency F1 (a relay link of the uplink) and a base station receives the signal. Note that the direct link of the uplink is a link to communicate directly from the mobile station to the base station not through the relay station, but it uses the resource block of the frequency F1 successively over the time slots of time T1 and time T2.

Note that it is described above that each of the four squares in FIG. 5 corresponds respectively to what is called resource blocks in LTE. The size of the time direction of the square may be a time slot separated by a resource blocks, or may be a sub frame that is a time slot of two resource blocks. For a preferable embodiment, the latter may be easier to be operated.

Further, if a standard frequency bandwidth for transmitting/receiving in a cell is 20 MHz, a resource block includes 12 sub-carriers with intervals of 15 kHz, therefore, the size of the frequency direction of the square in FIG. 5 is 180 kHz in width. The frequency assignment of the central frequency and the boundary frequency in the intercell interference coordination has been illustrated in FIG. 3B, FIG. 3C, FIG. 3D. This is used by dividing the resource block at 180 kHz increments into approximately three regions over a system bandwidth of 20 MHz. On the other hand, a method to bind a plurality of frequency bands to communicate may be considered. For example, in case of using carrier aggregation that communicates in a bandwidth of binding five bandwidths of 20 MHz (100 MHz in total), three frequency bands (see FIGS. 3B-3D) of the intercell interference coordination could be separated by 20 MHz guard bands (60 MHz used for signaling and 40 MHz used for separation). Therefore, the size of the square in FIG. 5 in the frequency direction may be a bandwidth of 20 MHz.

Incidentally, when intercell interference coordination (fractional frequency repetition) is performed, the frequency used for communication is different depending on the position of the mobile station even in the same cell and it is necessary to consider that a mobile station in the center region uses the central frequency and a mobile station in the boundary region uses the boundary frequency (mentioned above).

It is natural to think that a mobile station that needs a relay station is located in the boundary region. In such a case, it is reasonable to use the boundary frequency for communication between the relay station and the mobile station, that is, for an access link. On the other hand, two cases of the relay station can be considered: being in the center region and the boundary region. In other words, both cases of the use of the central frequency and the boundary frequency can be considered for a relay link. In FIG. 4, three use cases of Cases 1 to 3 are shown as communication examples between a base station and a mobile station via a relay station in a cell. If a central frequency F1 is used in the center region and a boundary frequency F2 in the boundary region, frequencies used by a relay link and an access link in each case can be summarized as the table shown below:

TABLE 11

|  | Relay link frequency | Access link frequency |
| --- | --- | --- |
| Case 1 | F1 | F2 |
| Case 2 | F2 | F2 |
| Case 3 | F1 | F1 |

Referring to FIG. 5 again, the same frequency is used for a relay link and an access link for each of an uplink and a downlink so that the relay link and access link, and the uplink and downlink of the relay station should not interfere with each other. In Table 1, in contrast, Case 1 (relay node in central region and MS in boundary region) uses the central frequency for a relay link and the boundary frequency for an access link. In other words, the relay link and the access link use different frequencies so that FIG. 5 shows an inappropriate relay mode.

From the viewpoint of using the boundary frequency for both a relay link and an access link in Case 2 (both relay node and MS are in boundary region), on the other hand, FIG. 5 may show an appropriate relay mode. Though Case 3 (both relay node and MS are in the central region) in which a mobile station in the center region is relayed by a relay station is rare, FIG. 5 may also show an appropriate relay mode from the viewpoint of using the central frequency for both a relay link and an access link. However, in the example shown in FIG. 4, Case 2 is Case 2 for both an uplink and a downlink and similarly Case 3 is Case 3 for both an uplink and a downlink. That is, the same frequency is used for both an uplink and a downlink. In contrast, the relay mode shown in FIG. 5 is configured to have demultiplexed frequencies for an uplink and a downlink (the boundary frequency F2 is used for a downlink and the central frequency F1 for an uplink) and is not desirable, since it would either give rise to inefficient use of shared wireless resources (e.g., frequencies used in multiple cells) or intercell interference.

As identified by the present inventor, the relay mode shown in FIG. 5 is not desirable in any of Cases 1 to 3 in FIG. 4.

From the above description, a relation between intercell interference coordination (fractional frequency repetition) and a relay station will be summarized. While a mobile station that needs a relay by a relay station is normally located in the boundary region, both cases of being located in the center region and the boundary region can be considered for a relay station. Thus, it is necessary to provide a relay mode corresponding to the position where a relay station is located in a cell (that is, which of the center region and the boundary region the relay station is located).

FIGS. 6 to 10 exemplify relay modes that can be applied to one of Cases 1 to 3 shown in FIG. 4 in accordance with the position where a relay station is located in a cell. In all relay modes, a scheduler mounted on a base station assigns time slots by demultiplexing a time slot in terms of the time and frequency in such a way that a relay link and an access link of a relay station do not interfere with each other and also an uplink and a downlink do not interfere with each other.

Figure 6:
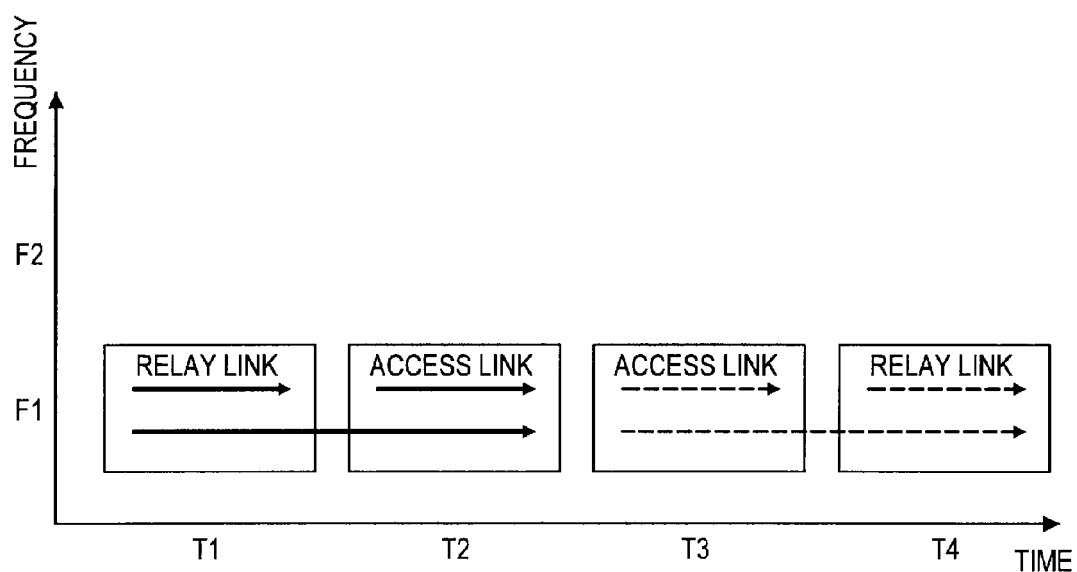
FIG. 6 is a diagram illustrating a relay mode in accordance with a position where the relay station is located inside the cell.

The relay mode shown in FIG. 6 is applicable for Case 3 and uses a predetermined central frequency F1 and the transmission power that is not enough to reach adjacent cells for both an uplink and a downlink, demultiplexes the uplink and downlink in the time direction, and demultiplexes a relay link and an access link for each of the uplink and downlink. This relay mode is suitable for a case when both a mobile station and a relay station are located in the center region corresponding to, for example, Case 3 in FIG. 4. The possibility that a relay station mediates for communication with a base station in which a mobile station is located in the center region is low. Nevertheless, it is possible, such as when a mobile station is deep inside a building or tunnel, it is desirable to relay by a relay station near a window of the building or near an entrance of the tunnel.

During a downlink, a base station transmits a signal in the time slot of time T1 by using resource blocks of the central frequency F1 (a relay link of the downlink). A relay station receives the signal in the relay link of the downlink and after storing the signal in a buffer, transmits the signal in the time slot of time T2 by using resource blocks of the central frequency F1 (an access link of the downlink). Then, a mobile station receives the signal in the access link of the downlink in the time slot of time T2 using resource blocks of the central frequency F1.

During an uplink, on the other hand, a mobile station transmits a signal in the time slot of time T3 by using resource blocks of the central frequency F1 (an access link of the uplink) and a relay station receives the signal. Then, the relay station receives the signal in the access link of the uplink and after buffering the signal, transmits the signal in the time slot of time T4 by using resource blocks of the central frequency F1 (a relay link of the uplink) and a base station receives the signal.

Figure 11:
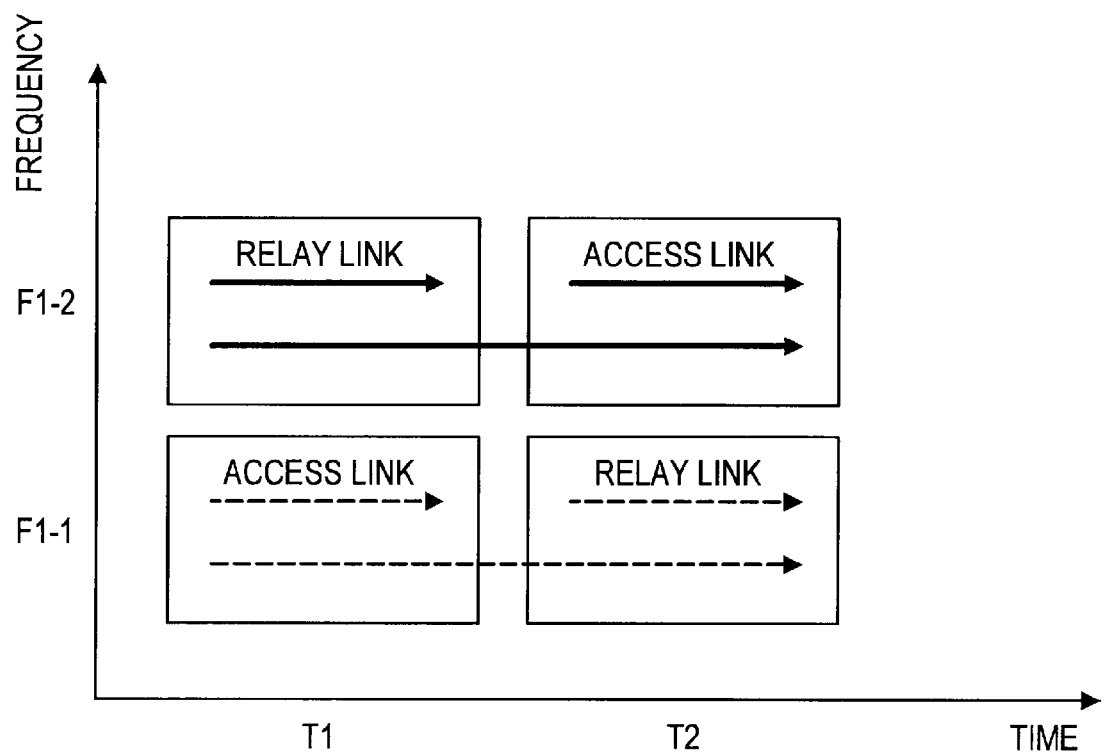
FIG. 11 is a diagram illustrating the relay mode in accordance with the position where the relay station is located inside the cell.

In the example shown in FIG. 6, the resource blocks are not demultiplexed in the frequency direction, but an uplink and a downlink are demultiplexed in the time direction. In contrast, as a modification is shown in FIG. 11, which is applicable for Case 3, the central frequency F1 may be divided into two frequencies F1-1 and F1-2 to multiplex the downlink and the uplink in the frequency direction, but not unnecessarily use frequencies allocated for the boundary region.

During a downlink, a base station transmits a signal in the time slot of time T1 by using resource blocks of the frequency F1-2 (a relay link of the downlink). A relay station receives the signal in the relay link of the downlink and after storing the signal in a buffer, transmits the signal in the time slot of time T2 by using resource blocks of the frequency F1-2 (an access link of the downlink). Then, a mobile station receives the signal in the access link of the downlink in the time slot of time T2 using resource blocks of the frequency F2.

During an uplink, on the other hand, a mobile station transmits a signal by using a resource block of the time slot of time T1 and of the frequency F1-1 (an access link of the uplink) and a relay station receives the signal. Then, the relay station receives the signal in the access link of the uplink and after buffering the signal, transmits the signal by using a resource block of the time slot of time T2 and of the frequency F1-1 (a relay link of the uplink) and a base station receives the signal.

Figure 7:
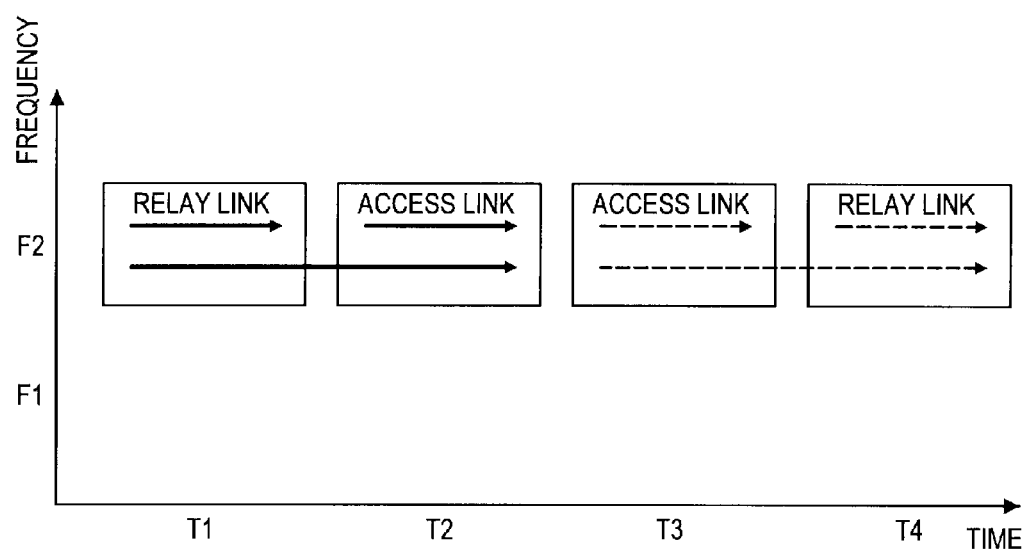
FIG. 7 is a diagram illustrating the relay mode in accordance with the position where the relay station is located inside the cell.

The relay mode illustrated in FIG. 7 relates to Case 2 and uses the boundary frequency F2 that avoids interference with adjacent cells for both an uplink and a downlink, demultiplexes the uplink and downlink in the time direction, and demultiplexes a relay link and an access link in the time direction in each of the uplink and downlink. This relay mode is suitable for a case when both a mobile station and a relay station are located in the boundary region corresponding to, for example, Case 2 in FIG. 4.

During a downlink, a base station transmits a signal in the time slot of time T1 by using resource blocks of the boundary frequency F2 (a relay link of the downlink). A relay station receives the signal in the relay link of the downlink and after storing the signal in a buffer, transmits the signal in the time slot of time T2 by using resource blocks of the boundary frequency F2 (an access link of the downlink). Then, a mobile station receives the signal in the access link of the downlink in the time slot of time T2 using resource blocks of the boundary frequency F2.

During an uplink, on the other hand, a mobile station transmits a signal in the time slot of time T3 by using resource blocks of the boundary frequency F2 (an access link of the uplink) and a relay station receives the signal. Then, the relay station receives the signal in the access link of the uplink and after buffering the signal, transmits the signal in the time slot of time T4 by using resource blocks of the boundary frequency F2 (a relay link of the uplink) and a base station receives the signal.

Figure 12:
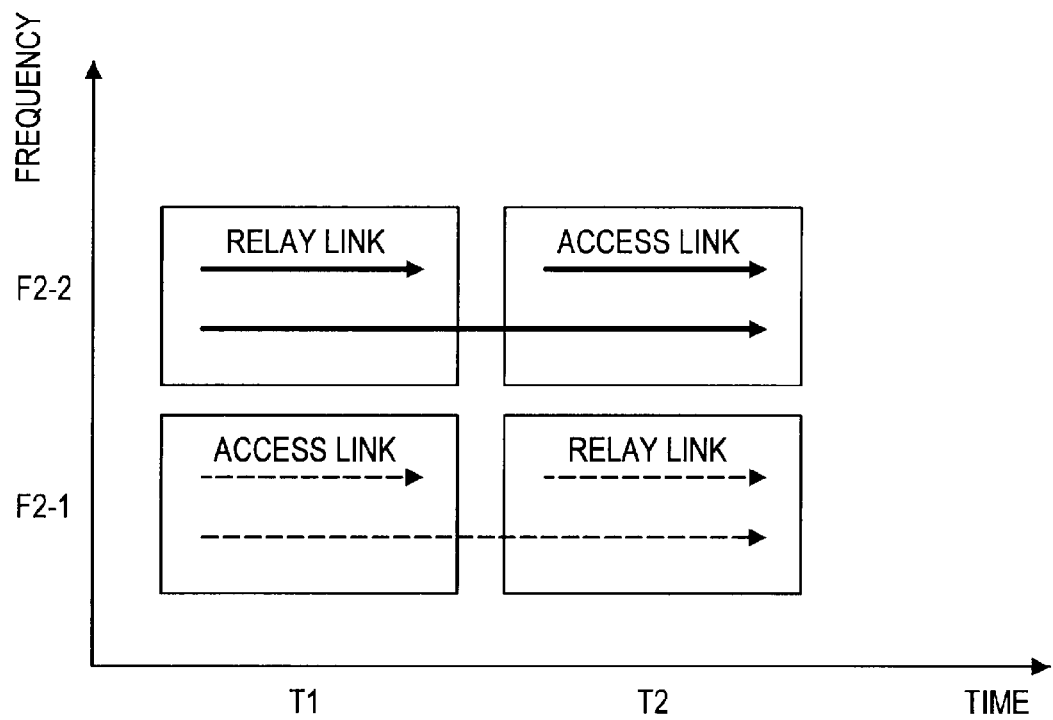
FIG. 12 is a diagram illustrating the relay mode in accordance with the position where the relay station is located inside the cell.

In the example shown in FIG. 7, the resource blocks are not demultiplexed in the frequency direction, but an uplink and a downlink are demultiplexed in the time direction. In contrast, as a modification is shown in FIG. 12, which relates to Case 2, the boundary frequency F2 may be divided into two frequencies F2-1 and F2-2 to multiplex the downlink and the uplink in the frequency direction.

During a downlink, a base station transmits a signal in the time slot of time T1 by using resource blocks of the frequency F2-2 (a relay link of the downlink). A relay station receives the signal in the relay link of the downlink and after storing the signal in a buffer, transmits the signal in the time slot of time T2 by using resource blocks of the frequency F2-2 (an access link of the downlink). Then, a mobile station receives the signal in the access link of the downlink in the time slot of time T2 using resource blocks of the frequency F2-2.

During an uplink, on the other hand, a mobile station transmits a signal by using a resource block of the time slot of time T1 and of the frequency F2-1 (an access link of the uplink) and a relay station receives the signal. Then, the relay station receives the signal in the access link of the uplink and after buffering the signal, transmits the signal by using a resource block of the time slot of time T2 and of the frequency F2-1 (a relay link of the uplink) and a base station receives the signal.

Figure 8:
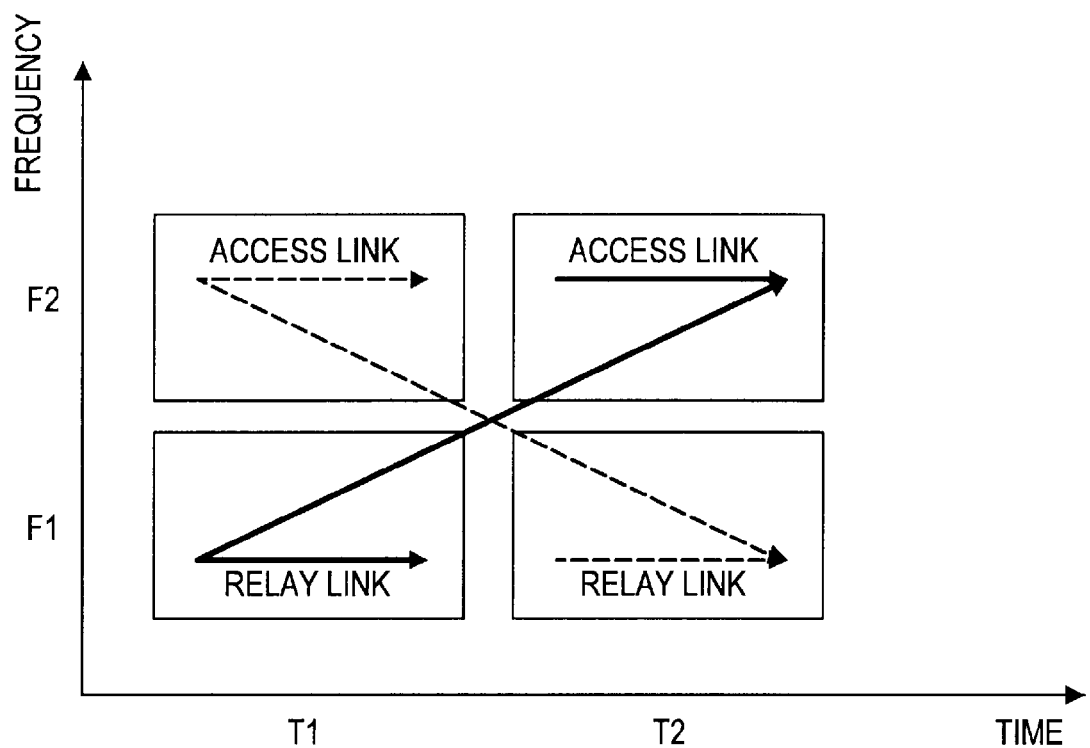
FIG. 8 is a diagram illustrating the relay mode in accordance with the position where the relay station is located inside the cell.

The relay mode illustrated in FIG. 8 relates to Case 1 and uses a predetermined central frequency F1 and transmission power that is not enough to reach adjacent cells for a relay link and a boundary frequency F2 that avoids interference with adjacent cells for an access link in each of an uplink and a downlink multiplexed in the time direction. This relay mode demultiplexes the relay link and the access link in the frequency direction and multiplexes the downlink and the uplink in the time direction (the relay link and access link are demultiplexed in the frequency direction and the time direction in each of the downlink and uplink and also the downlink and uplink are multiplexed in the time direction). This relay mode is suitable for a case when a relay station located in the central region relays to a mobile station located in the boundary region corresponding to, for example, Case 1 in FIG. 4. The relay mode illustrated basically uses the central frequency F1 for the relay link and the boundary frequency F2 for the access link. The longer arrows represent direct links, and indicate that the base station and mobile station change frequencies in time slots of times T1 and T2.

During a downlink, a base station transmits a signal in the time slot of time T1 by using resource blocks of the central frequency F1 (a relay link of the downlink). A relay station receives the signal in the relay link of the downlink and after storing the signal in a buffer, transmits the signal in the time slot of time T2 by using resource blocks of the boundary frequency F2 (an access link of the downlink). Then, a mobile station receives the signal in the access link of the downlink in the time slot of time T2 using resource blocks of the boundary frequency F2.

During an uplink, on the other hand, a mobile station transmits a signal in the time slot of time T1 by using resource blocks of the boundary frequency F2 (an access link of the uplink) and a relay station receives the signal. Then, the relay station receives the signal in the access link of the uplink and after buffering the signal, transmits the signal in the time slot of time T2 by using resource blocks of the central frequency F1 (a relay link of the uplink) and a base station receives the signal.

Figure 9:
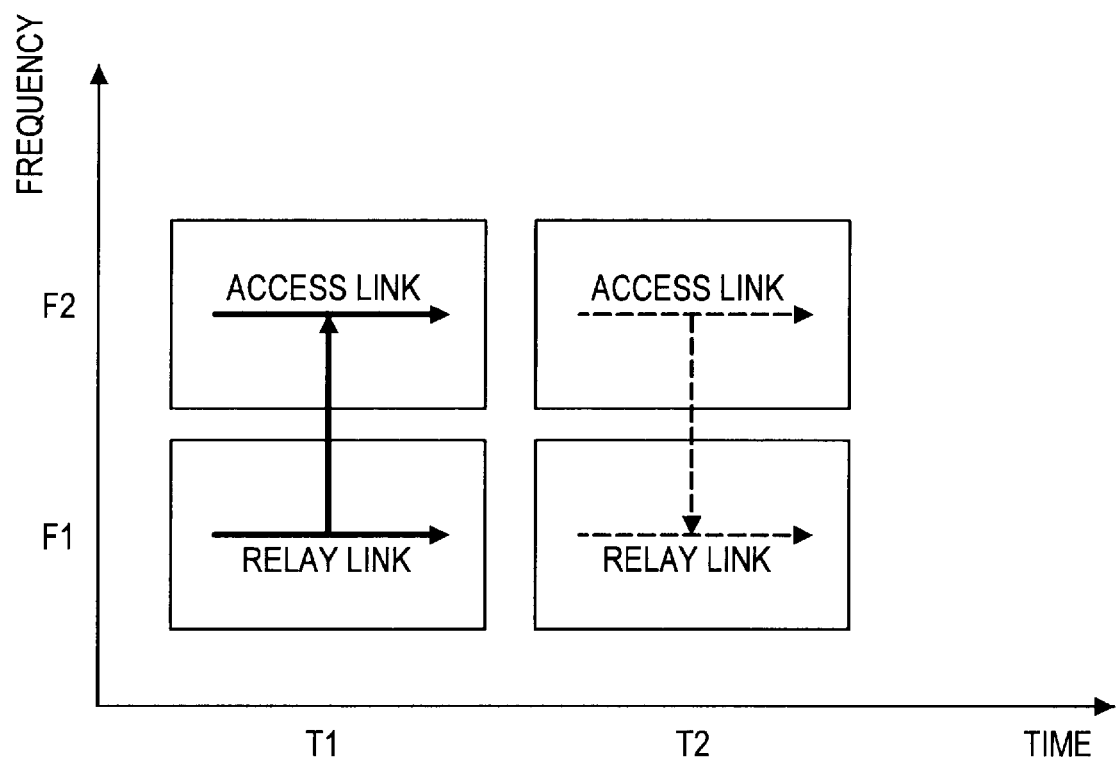
FIG. 9 is a diagram illustrating the relay mode in accordance with the position where the relay station is located inside the cell.

The relay mode illustrated in FIG. 9 also relates to Case 1 and demultiplexes the uplink and downlink in the time direction and multiplexes the relay link and the access link in the frequency direction (the downlink and uplink are demultiplexed in the time direction, while the relay link and the access link are multiplexed in the frequency direction the time direction). For the downlink, the relay mode uses the predetermined central frequency F1 and transmission power that is not enough to reach adjacent cells for the relay link, and uses the boundary frequency F2 that avoids interference with adjacent cells for the access link as well. On the other hand, for the uplink, the relay mode uses the boundary frequency F2 that avoids interference with adjacent cells for a relay link, and uses the predetermined central frequency F1 and the transmission power that is not enough to reach adjacent cells for the access link The vertical lines in the figure depict a linkage between the relay link and access link being for an uplink or downlink and show that data from an originating source (e.g., base station) is then forwarded (by the relay node) to the destination (e.g., MS). Generally, this relay mode is suitable, same as FIG. 8, for a case when a relay station located in the central region relays to a mobile station located in the boundary region corresponding to, for example, Case 1 in FIG. 4.

As a downlink, a base station transmits a signal in the time slot of time T1 by using resource blocks of the central frequency F1 (a relay link of the downlink). While receiving the signal in the relay link of the downlink, a relay station transmits the signal in the time slot of the same time T1 by using resource blocks of the boundary frequency F2 (an access link of the downlink). Then, a mobile station receives the signal in the access link of the downlink in the time slot of time T1 using resource blocks of the boundary frequency F2.

As an uplink, on the other hand, a mobile station transmits a signal in the time slot of time T2 by using resource blocks of the boundary frequency F2 (an access link of the uplink) and a relay station receives the signal. Then, while receiving the signal in the access link of the uplink, the relay station transmits the signal in the time slot of time T2 by using resource blocks of the central frequency F1 (a relay link of the uplink) and a base station receives the signal.

The relay mode shown in FIG. 9 is similar to that shown in FIG. 8 in that the central frequency F1 is used for a relay link and the boundary frequency F2 for an access link, but is different in that the relay link and access link are multiplexed in the frequency direction in each of a downlink and an uplink and has an advantage that a delay involved in relay is slight. However, the relay station in this case needs a circuit because the relay station performs a transmission/reception operation multiplexed in the frequency axis direction (that is, a transmission/reception operation is performed at the same time) such as transmitting at the boundary frequency F2 simultaneously while receiving at the central frequency F1.

Figure 10:
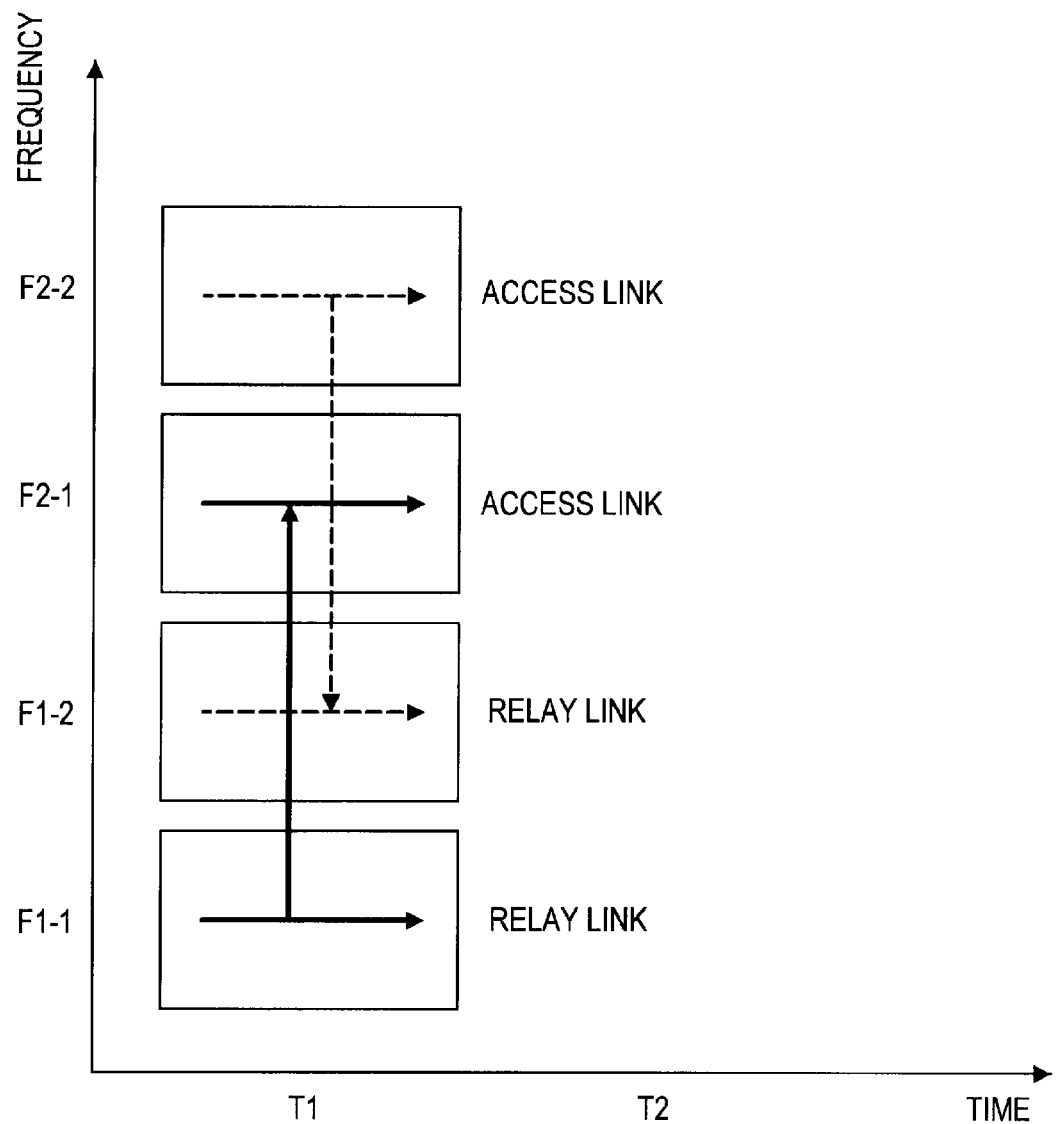
FIG. 10 is a diagram illustrating the relay mode in accordance with the position where the relay station is located inside the cell.

The relay mode illustrated in FIG. 10 also relates to Case 1 and uses a predetermined central frequency and transmission power that is not enough to reach adjacent cells for a relay link, and uses a boundary frequency that avoids interference with adjacent cells for an access link in each of an uplink and a downlink to multiplex the relay link and the access link in the frequency direction, while dividing the central frequency and the boundary frequency into halves (sub-bands) for the uplink and downlink to multiplex both the uplink and downlink in the frequency direction. This relay mode is suitable, same as FIGS. 8 and 9, for a case when a relay station located in the central region relays to a mobile station located in the boundary region corresponding to, for example, Case 1 in FIG. 4.

As a downlink, a base station transmits a signal in the time slot of time T1 by using resource blocks of the central frequency F1-1 (a relay link of the downlink). While receiving the signal in the relay link of the downlink, a relay station transmits the signal in the time slot of the same time T1 by using resource blocks of the boundary frequency F2-1 (an access link of the downlink). Then, a mobile station receives the signal in the access link of the downlink in the time slot of time T1 using resource blocks of the boundary frequency F2-1.

As an uplink, on the other hand, a mobile station transmits a signal in the time slot of time T1 by using resource blocks of the boundary frequency F2-2 (an access link of the uplink) and a relay station receives the signal. Then, while receiving the signal in the access link of the uplink, the relay station transmits the signal in the time slot of time T1 by using resource blocks of the central frequency F1-2 (a relay link of the uplink) and a base station receives the signal.

The relay mode shown in FIG. 10 is similar to that shown in FIG. 8 in that the central frequency F1 is used for a relay link and the boundary frequency F2 for an access link, but the relay link and access link are multiplexed in the frequency direction in each of a downlink and an uplink. The relay station in this case needs a circuit to perform a transmission/reception operation at the same time.

The relay mode shown in FIG. 10 is different from the relay mode shown in FIG. 9 in that the central frequency F1 is divided into two frequencies F1-1 and F1-2, divides the boundary frequency F2 into two frequencies F2-1 and F2-2, and further a downlink and an uplink are also multiplexed in the time direction, and has an advantage that a delay involved in relay is still slighter. Whether the relay mode shown in FIG. 10 can be adopted depends also on whether occupation of four frequency bands (division into two of each of the central frequency and the boundary frequency by a relay station) is permitted for communication with the relevant mobile station.

Applicability of each relay mode shown in FIGS. 6 to 10 to each of Cases 1 to 3 shown in FIG. 4 is summarized in the table below.

TABLE 2

| | Case | | |
| Mode | Case 1 | Case 2 | Case 3 |
| --- | --- | --- | --- |
| FIG. 6 | | | ○ |
| FIG. 7 | | ○ | |
| FIG. 8 | ○ | | |
| FIG. 9 | ○ | | |
| FIG. 10 | ○ | | |

A base station controls communication operations of a downlink and an uplink with a mobile station through a relay by a relay station in a unifying fashion and it is necessary for the base station to demultiplex a time slot in terms of the time and frequency in such a way that a relay link and an access link of a relay station do not interfere with each other and also an uplink and a downlink do not interfere with each other. As is evident from Table 2, the relay mode (that is, resource assignment to a relay link and an access link in a downlink and an uplink) needs to be decided in consideration of positions in a cell of the relay station and mobile station.

Thus, in a cellular system according to the present embodiment, the base station designates the relay mode for a relay station in the local cell according to each item below:

(1) Position of a relay station (which of the center region and boundary region the relay station is located in)

(2) Position of a mobile station belonging to the relay station (which of the center region and boundary region the mobile station is located in)

Figure 13:
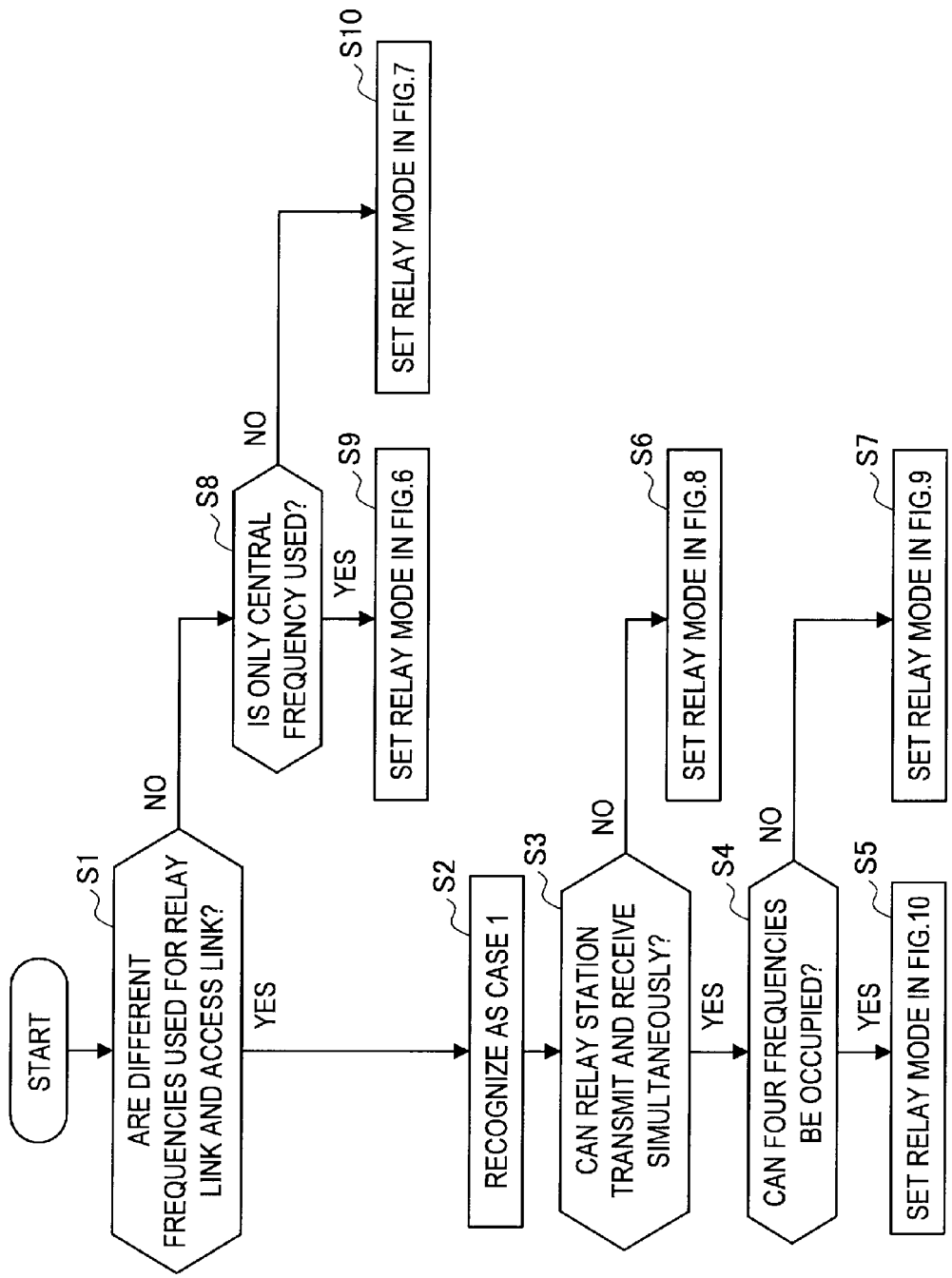
FIG. 13 is a flow chart showing a processing procedure for the base station to decide the relay mode inside the cell.

(3) Whether the relay station can perform a transmission/reception operation simultaneously by multiplexing in the frequency direction FIG. 13 shows a processing procedure for the base station to decide the relay mode of the relay station inside the cell in a flow chart form.

First, whether different frequencies should be used for a relay link and an access link, that is, whether the central frequency should be used for a relay link and the boundary frequency for an access link is checked (step S1). Step S1 corresponds to judgments of the above items (1) and (2).

If different frequencies are used for a relay link and an access link (Yes in step S1), a judgment is made that positions of the relay station and mobile station correspond to Case 1 in FIG. 4 (step S2). In this case, communication capabilities, that is, whether the relay station can perform a transmission/reception operation simultaneously by multiplexing in the frequency direction is further checked listed in the above item (3) (step S3).

If it is difficult for the relay station to perform a transmission/reception operation simultaneously by multiplexing in the frequency direction (No in step S3), the relay mode shown in FIG. 8 is set (step S6).

If a judgment is made that the rely station can perform a transmission/reception operation simultaneously by multiplexing in the frequency direction (Yes in step S3), subsequently, whether occupation of four frequency bands is permitted for communication with the relevant mobile station is checked (step S4).

If occupation of four frequency bands is permitted for communication with the relevant mobile station (Yes in step S4), the relay mode shown in FIG. 10 is set (step S6). If occupation of four frequency bands is not permitted for communication with the relevant mobile station (No in step S4), the relay mode shown in FIG. 9 is set (step S7).

If, on the other hand, a judgment is made that the same frequency is used for a relay link and an access link (No in step S1), subsequently, whether the central frequency is used for both a relay link and an access link is checked (step S8).

If the central frequency is used for both a relay link and an access link (Yes in step S8), positions of the relay station and mobile station can be judged to correspond to Case 3 in FIG. 4 and the relay mode shown in FIG. 6 is set (step S9).

If the boundary frequency is used for both a relay link and an access link (No in step S8), positions of the relay station and mobile station can be judged to correspond to Case 2 in FIG. 4 and the relay mode shown in FIG. 7 is set (step S10).

Then, the base station signals the relay mode decided according to the above processing procedure to the relevant relay station and mobile station.

The base station may perform the processing procedure shown in FIG. 13, when updating an assignment of the radio resources in the local cell. It is arbitrary how often the assignment of the radio resource in the local cell is updated. For example, the base station may perform the processing procedure shown in FIG. 13 for each radio frame to update assignment of radio resources in the local cell. In such a case, the relay mode can adaptively be changed for each radio frame in accordance with movement of the mobile station.

A network operation mode that is static to some extent may be applied, instead of repeatedly updating in radio frame unit. That is, a company may continue to use the same relay mode in a cell for a long period of time, about a year, for example. On the other hand, a more dynamic allocation can be used based on scheduled events (e.g., monthly) or demand usage (e.g., network usage in an area that has expanded over time and now requires intercell coordination to accommodate its mobile subscribers). In other words, the subject matter of the present invention includes an operation mode in which a company implements more than two relay modes and uses each of them separately. Further, besides a case where a base station determines a relay mode based on information on positions of the relay station and the mobile station, the base station may adapt a relay mode set by the company, such as where a system administrator sets (programmably or physically) the relay mode to be employed by the base station. Optionally, the base station or network administrator may send a control signal to all network resources indicating the time and parameters of the mode change.

In step S1, whether the same frequency is used for a relay link and an access link (or whether one of the central frequency and the boundary frequency is used for each of a relay link and an access link) can be judged based on which of the center region and the boundary region of a cell the target relay station and mobile station are located in. Moreover, the base station can determine in which region, either the central region or the boundary region, the relay station and the mobile station locate, based on the communication range with each of the stations.

Figure 17:
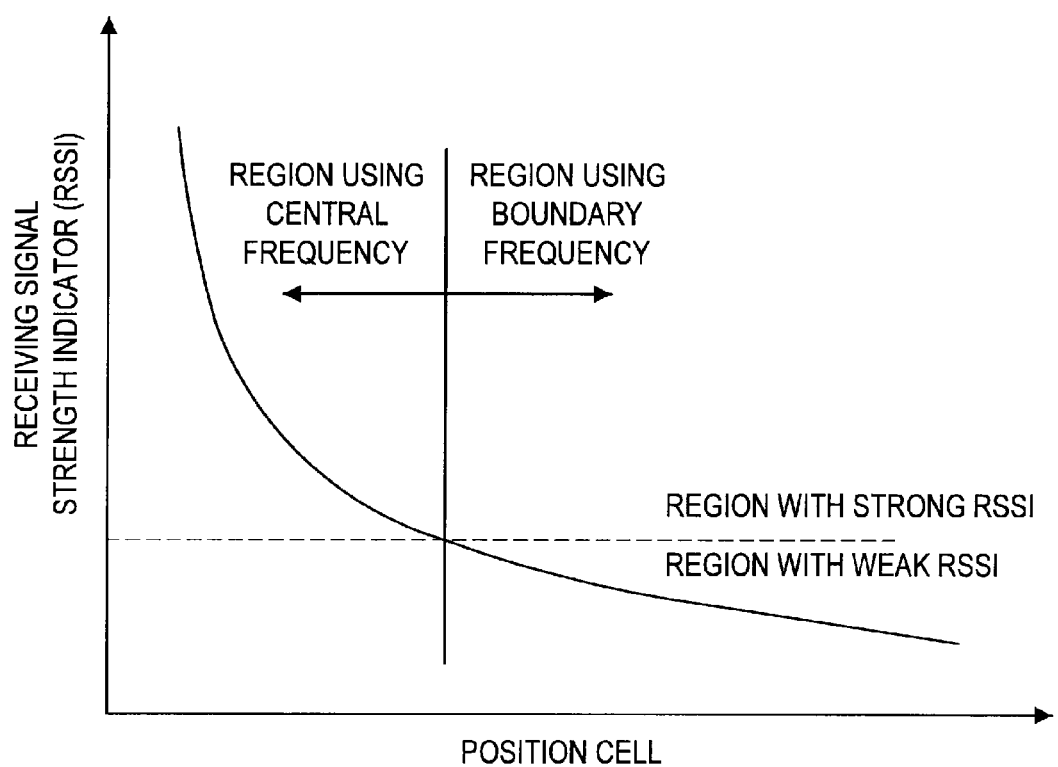
FIG. 17 is a diagram showing a relationship between a receiving signal strength and a communication range from the base station (positions of a relay station and a mobile station in a cell).

Here, the communication range between communicating stations can be measured from the receiving signal strength indicator (RSSI). When receiving a radio signal from the relay station and the mobile station, the base station may obtain the receiving signal strength from each of the stations. FIG. 17 shows a relationship between the receiving signal strength and the communication range from the base station (positions of the relay station and the mobile station in a cell). As shown, the more distant the relay station and the mobile station locate from the base station, the more the receiving signal strength weakens. It can be estimated that a position where the receiving signal strength is stronger than the predetermined threshold is a central region, a position where the receiving signal strength is weaker than the predetermined threshold is a boundary region. Further, the base station may determine which to use, either the central region or the boundary region, for each of the relay link and the access link based on the estimated result of the positions of the relay station and the mobile station. The threshold of the strong vs. weak RSSI may be dynamically changed to accommodate system demands. For example, if the network operator determines that more resources are being used in the central region than the boundary region (perhaps indicating a new cell site) the RSSI strong/weak threshold may be decreased to allow for boundary frequencies to be used more often. On the other hand, more crowded areas may make it prudent to increase the RSSI strong/weak threshold to avoid more intercell interference. Likewise, the base station can shift its radiated power levels to set a different size for a center region to accommodate traffic demands.

Moreover, as another method how the base station obtains information on the position of the relay station and the mobile station, there may be a method to inform the base station of information on a position measured by GPS using a channel of an uplink while the relay station and/or the mobile station use a GPS (Global Positioning System) to determine position. The base station may determine which to use, either the central frequency or the boundary frequency, for each of the relay link and the access link based on information on the position notified by the relay station and the mobile station. This position information may dynamically change based on movement of the relay node or the MS, and the base station is kept appraised of the movement to allow for shifting of wireless resources.

Moreover, as yet another method how the base station obtains information on the position of the relay station and the mobile station, there may be a method to utilize an initialization procedure used when the relay station and the mobile station access a network. As one of the initialization procedures to access the network, a random access is to be performed. At a time of random access, the base station can obtain information on how long a delay of a signal transmitted from the relay station and the mobile station is (timing advanced value). Since the delay is large if the communication range is long, and the delay is small if the communication range is short, the base station can estimate the positions of the relay station and the mobile station based on the timing advanced value. Thus, as the estimation result, the base station may determine which to use, either the central frequency or the boundary frequency fro each of the relay link and the access link. However, the subject matter of the present invention is not limited to a specific measurement method.

As yet a further alternative, the mobile station and relay node may report to the base station whether they can receive control signals from other base stations on boundary frequencies. If they can, this indicates that the mobile station and/or relay node are in the boundary region.

Figure 14:
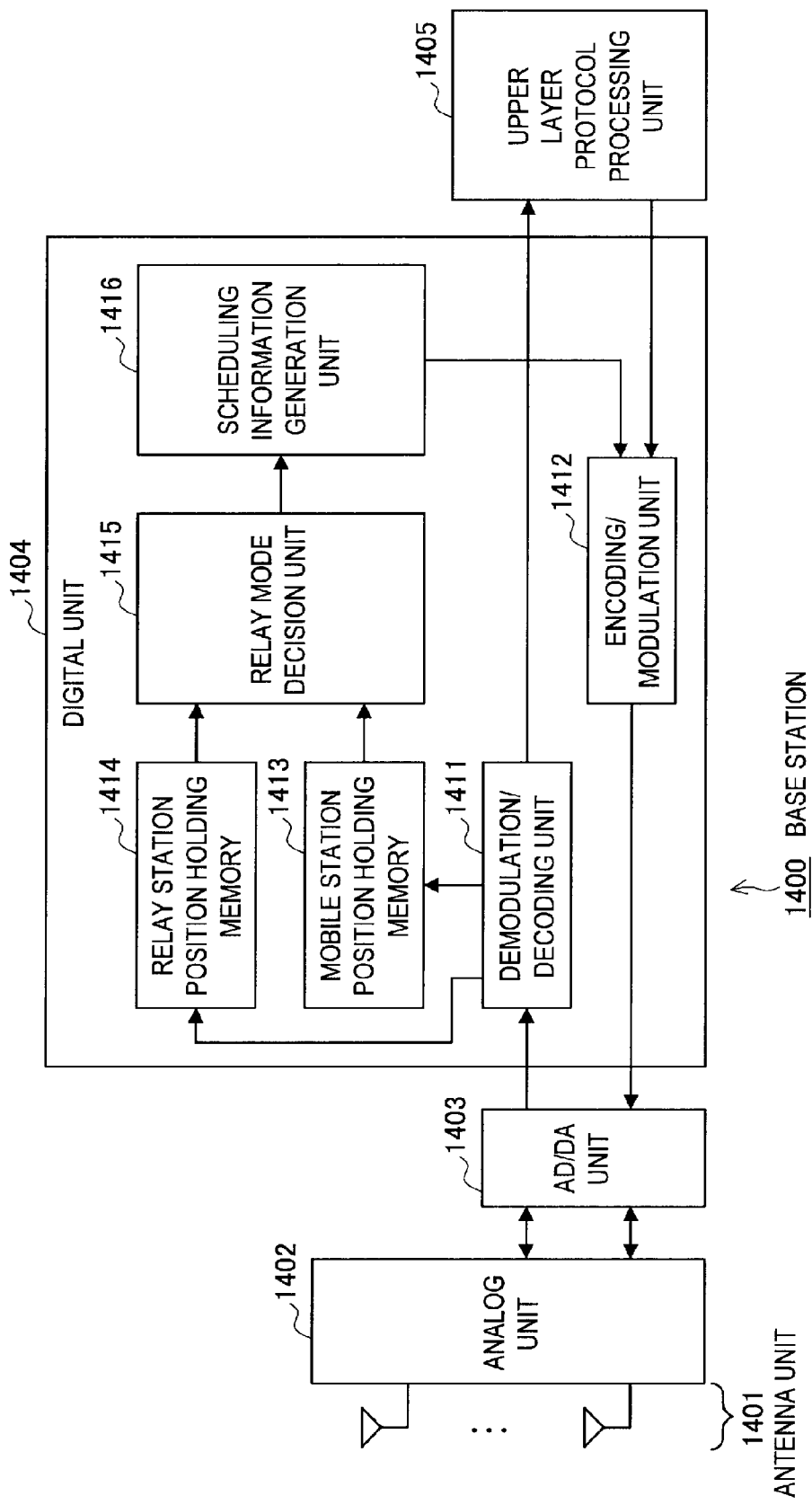
FIG. 14 is a diagram schematically showing a functional configuration of the base station operating in a cellular system according to an embodiment of the present invention.

FIG. 14 schematically shows a functional configuration of the base station operating in a cellular system according to the present embodiment. An illustrated base station 1400 is constituted by an antenna unit 1401, an analog unit 1402 that performs analog processing of a transmission/reception signal, an AD/DA processing unit 1403 that performs digital conversion of an analog reception signal or analog conversion of a digital transmission signal, a digital unit 1404 that performs digital processing of a transmission/reception signal, and an upper layer protocol processing unit 1405 that performs a data transmission request, reception data processing and the like.

The base station 1400 has, for example, a plurality of antenna elements as the antenna unit 1401 and adopts the space division multiple access scheme in which radio resources on spatial axes are shared by a plurality of users like multi-user MU-MIMO or SDMA to realize high-throughput communication, which is not, however, directly related to the gist of the present invention and thus is herein omitted.

The upper layer protocol processing unit 1405 can also be constituted as a general computer system such as a personal computer, which is not, however, directly related to the gist of the present invention and thus is herein omitted.

The digital unit 1404 includes, in addition to a demodulation/decoding unit 1411 that performs demodulation and decoding processing of a reception signal and an encoding/modulation unit 1412 that performs encoding and modulation processing of a transmission signal, functional modules such as a mobile station position holding memory 1413, a relay station position holding memory 1414, a relay mode decision unit 1415, and a scheduling information generation unit 1416 to perform management of the radio resource in the local cell, that is, scheduling. The functional modules 1413 to 1416 can be constituted by dedicated hardware, but can also be realized by a predetermined software program being executed by a processor.

When positions of a relay station 1500 (described below) in a local cell and a mobile station 1600 (described below) belonging to the relay station 1500 are measured or estimated based on a digital reception signal on which demodulation and decoding processing has been performed by the demodulation/decoding unit 1411, results thereof are stored in the relay station position holding memory 1414 and the mobile station position holding memory 1413 respectively. Communication ranges to the relay station 1500 and the mobile station 1600 can be measured based on, for example, the receiving signal strength indicator to detect positions thereof based on results thereof. When receiving a radio signal from the relay station 1500 and the mobile station 1600, the base station 1400 obtains the receiving signal strength from each of stations, and determines a frequency to use (as described before). Moreover, information on position of the relay station 1500 and the mobile station 1600, which is treated by the base station 1400, may be at such a level that to which of the center region and boundary region the position information belongs is detected. The receiving signal strength or the frequency to use may be stored, in the mobile station position holding memory 1413 and in a relay station position holding memory 1414, as information on positions instead of information on positions as a resultant converted from the receiving signal strength.

The relay mode decision unit 1415 decides the relay mode according to the processing procedure shown in FIG. 13 based on the position of the relay station 1500 stored in the relay station position holding memory 1414, the position of the mobile station 1600 stored in the mobile station position holding memory 1413, and communication capabilities (that is, whether a transmission/reception operation can be performed simultaneously by multiplexing in the frequency direction) of the relay station 1500. For example, a relay mode is adaptively selected from relay modes shown in FIGS. 6 to 10.

The scheduling information generation unit 1416 as a scheduler assigns radio resources to the relay station 1500 and the mobile station 1600 belonging thereto conforming to the relay mode decided by the relay mode decision unit 1415 to generate scheduling information in the local cell. The relay station 1500 and the mobile station 1600 are notified of the scheduling information through a control channel.

Figure 15:
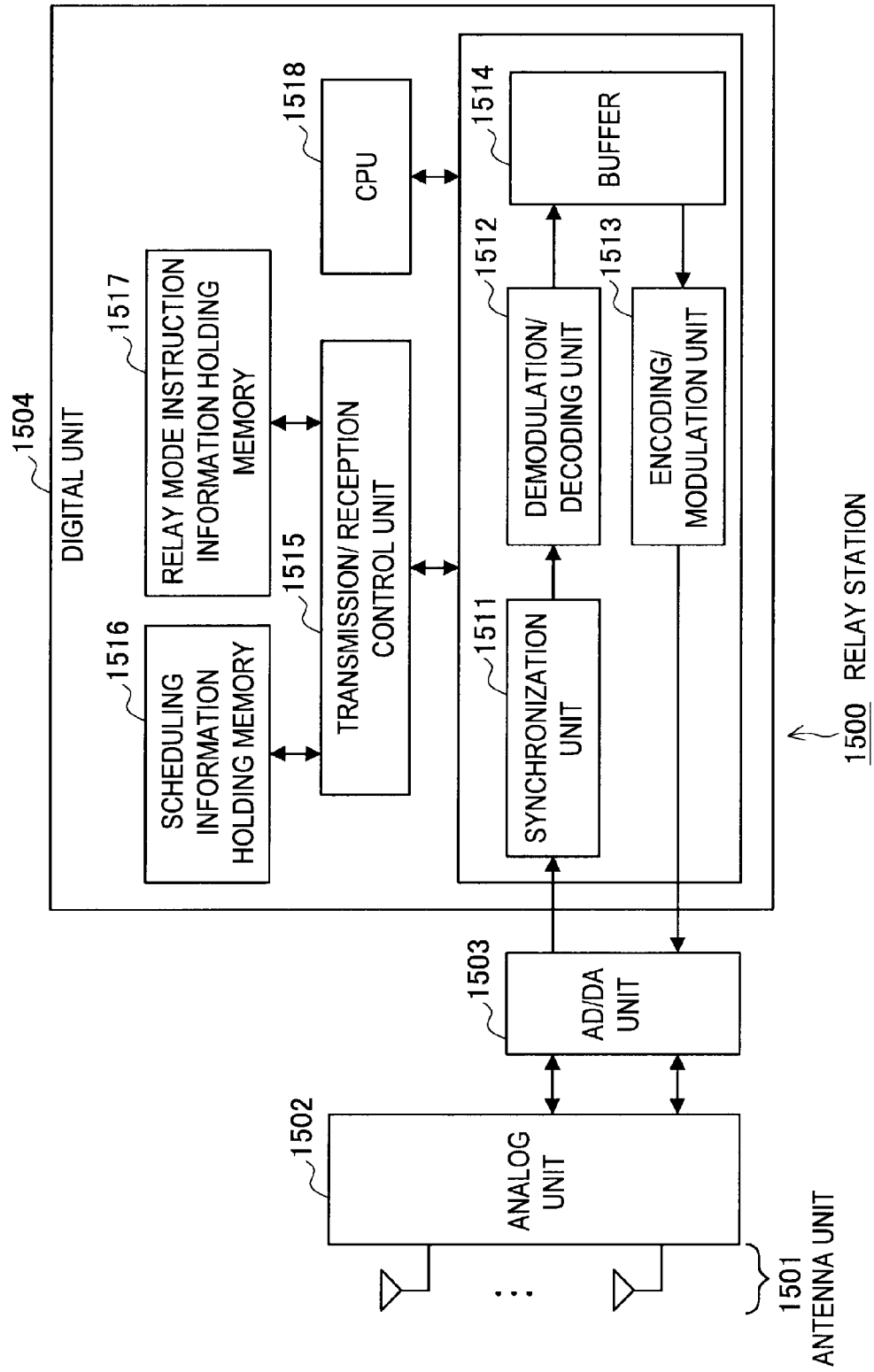
FIG. 15 is a diagram schematically showing the functional configuration of the relay station operating in the cellular system according to an embodiment of the present invention.

FIG. 15 schematically shows the functional configuration of the relay station operating in the cellular system according to the present embodiment. An illustrated relay station 1500 is constituted by an antenna unit 1501, an analog unit 1502 that performs analog processing of a transmission/reception signal, an AD/DA processing unit 1503 that performs digital conversion of an analog reception signal or analog conversion of a digital transmission signal, and a digital unit 1504 that performs digital processing of a transmission/reception signal.

The relay station 1500 has, for example, a plurality of antenna elements as the antenna unit 1501 and may adopt the space division multiple access scheme (same as above), but the gist of the present invention is not limited to this.

The digital unit 1504 is constituted by a transmission/reception control unit 1515 that controls operations of transmission/reception units (collectively the transmitter related components, receiver related components and controller components being a transceiver), a scheduling information holding memory 1516 that stores scheduling information and a relay mode transmitted from the base station 1400 through the control channel, a Relay mode instruction information holding memory 1517, and a CPU (Central Processing Unit) 1518 that controls operations inside the digital unit 1504 in a unifying fashion. The transmission/reception units are constituted by a synchronization unit 1511 that acquires synchronization from digital reception signals, a demodulation/decoding unit 1512 that performs demodulation and decoding processing of a reception signal according to the acquired synchronization, a buffer 1514 that temporarily holds transmission data, and an encoding/modulation unit 1513 that performs encoding and modulation processing of a transmission signal. The communication capabilities of the transmission/reception unit is arbitrary. In other words, it is arbitrary whether or not a transmission/reception operation simultaneously by multiplexing in a frequency direction.

The transmission/reception control unit 1515 controls reception processing in a relay link and transmission processing in an access link of a downlink and also reception processing in an access link and transmission processing in a relay link of an uplink using specified resource blocks according to scheduling information stored in the scheduling information holding memory 1516 and the relay mode stored in the Relay mode instruction information holding memory 1517.

The buffer 1514 has data received in a relay link of a downlink and addressed to a mobile station 1600 (described later) or data received in an access link of an uplink and addressed to the base station 1400 stored temporarily therein and transmits the data to the mobile station 1600 as an access link of the downlink or to the base station 1400 as a relay link of the uplink. The relay station 1500 temporarily holds a signal to be relayed in the buffer 1514 after demodulating and decoding the signal and then encodes and modulates the signal again for transmission. That is, the DF mode (mentioned above) is applied.

Figure 16:
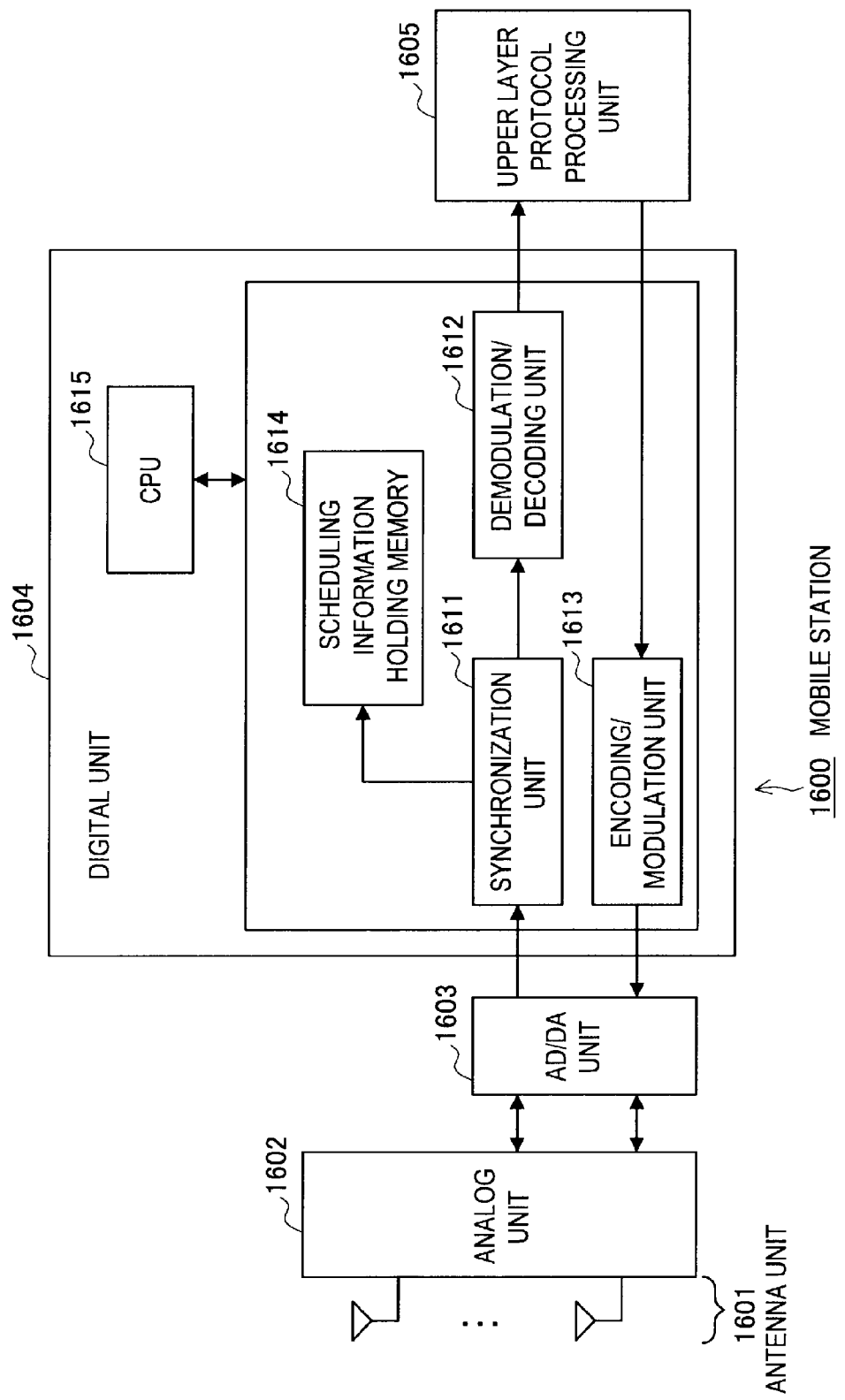
FIG. 16 is a diagram schematically showing the functional configuration of the mobile station operating in the cellular system according to an embodiment of the present invention.

FIG. 16 schematically shows the functional configuration for the mobile station operating in a cellular system according to the present embodiment. An illustrated mobile station 1600 is constituted by an antenna unit 1601, an analog unit 1602 that performs analog processing of a transmission/reception signal, an AD/DA processing unit 1603 that performs digital conversion of an analog reception signal or analog conversion of a digital transmission signal, a digital unit 1604 that performs digital processing of a transmission/reception signal, and an upper layer protocol processing unit 1605 that performs a data transmission request, reception data processing and the like.

The mobile station 1600 has, for example, a plurality of antenna elements as the antenna unit 1601 and may adopt the space division multiple access scheme (same as above), but the gist of the present invention is not limited to this. The upper layer protocol processing unit 1605 can also be constituted as a general computer system such as a personal computer (same as above).

The digital unit 1604 is constituted by a synchronization unit 1611 that acquires synchronization from digital reception signals, a demodulation/decoding unit 1612 that performs demodulation and decoding processing of a reception signal according to the acquired synchronization, an encoding/modulation unit 1613 that performs encoding and modulation processing of a transmission signal, a scheduling information holding memory 1614 that stores scheduling information transmitted from the base station 1400 through the control channel, and a CPU 1615 that controls operations inside the digital unit 1604 in a unifying fashion.

The scheduling information holding memory 1614 has resource blocks assigned to the local station stored therein as scheduling information. The synchronization unit 1611 and the demodulation/decoding unit 1612 perform reception processing by using resource blocks assigned for an access link of a downlink. The encoding/modulation unit 1613 performs a transmission operation by using resource blocks assigned for an access link of an uplink.

It should be understood that, by arranging the base station 1400, the relay station 1500, and the mobile station 1600, respectively illustrated in FIGS. 14 to 16, in the cell of the base station 1400, a cooperative operation of these communication stations causes the decision of an appropriate relay mode in the relay station in accordance with each piece of position information of the relay station 1500 and the mobile station 1600, and interference in an uplink and a downlink as well as in a relay link and an access link can be avoided in the relay station 1500.

Note that the processing procedure illustrated in FIG. 13 is to be executed by the base station to determine the relay mode of the relay station in the local cell, and the configuration example of the base station 1400 illustrated in FIG. 14 and the configuration example of the relay station illustrated in FIG. 15 are premised on the base station 1400 determining the relay mode of the relay station 1500 in the local cell. As its alternative example, there may be a method that the relay station, instead of the base station, determines the relay mode. In such an alternative example, the relay station is to be informed by the base station of information on positions of the relay station itself and the mobile station in the cell of the base station, or information on the receiving signal strength from the relay station and the mobile station that is received by the base station. Alternatively, the relay mode can be determined if the relay station collects such information by itself. Moreover the relay node need not report an actual position to the base station, but rather a determination of whether it is located in the center region or boundary region. Once again, this determination can be made based on (1) GPS, (2) signal strength of frequencies dedicated to the center region, (3) propagation delay, and (4) relative transmission strength from adjacent base stations.

Moreover, the processing to determine the relay mode can be dispersed on more than two different devices (for example, a base station and a relay station), considering differences between the access link and the relay link, or differences between the uplink and the downlink. For example, there may be a case where the base station determines the relay link from the base station to the relay station, but the relay station determines which relay mode is adapted for the access link from the relay station to the mobile station.

INDUSTRIAL APPLICABILITY

In the foregoing, the present invention has been described in detail with reference to specific embodiments. However, it is self-evident that persons skilled in the art can modify or replace such embodiments without deviating from the gist of the present invention.

Herein, the description has focused on embodiments obtained by applying the present invention to a mobile communication system, but the gist of the present invention is not limited to this. The present invention can similarly be applied to various communication systems including wireless LANs in which a base station and a mobile station communicate through the mediation of a relay station.

In summary, the present invention has been disclosed in the form of exemplification and content described herein should not be interpreted restrictively. Claims should be considered for judging the gist of the present invention.

REFERENCE SIGNS LIST

1400 Base station
1401 Antenna unit
1402 Analog unit
1403 AD/DA processing unit
1404 Digital unit
1405 Upper layer protocol processing unit
1411 Demodulation/decoding unit
1412 Encoding/modulation unit
1413 Mobile station position holding memory
1414 Relay station position holding memory
1415 Relay mode decision unit
1416 Scheduling information generation unit
1500 Relay station 1501 Antenna unit
1502 Analog unit
1503 AD/DA processing unit
1504 Digital unit
1511 Synchronization unit
1512 Demodulation/decoding unit
1513 Encoding/modulation unit
1514 Buffer
1515 Transmission/reception control unit
1516 Scheduling information holding memory
1517 Relay mode instruction information holding memory
1518 CPU
1600 Mobile station
1601 Antenna unit
1602 Analog unit
1603 AD/DA processing unit
1604 Digital unit
1605 Upper layer protocol processing unit
1611 Synchronization unit
1612 Demodulation/decoding unit
1613 Encoding/modulation unit
1614 Scheduling information holding memory
1615 CPU

The invention claimed is:

1. A mobile communication system comprising:
a base station including
a transmitter that provides wireless coverage in a cell, said cell being divided into a center region and a boundary region, said center region being surrounded by said boundary region, an outer edge of said boundary region defining an outer edge of said cell, said transmitter transmitting using first wireless resources allocated to the center region and second wireless resources allocated to the boundary region; and
a relay node, wherein
said relay node is configured to relay signals between said base station and a mobile station, said relay node including
controller circuitry configure to operate the relay node in a selected relay mode chosen from a plurality of relay modes based on position information of the mobile station and position information of the relay node relative to the boundary region and the center region, each of the plurality of relay modes specifying predetermined wireless resource assignments for communications between the base station and the relay node, and between the relay node and the mobile station,
a first relay mode of the plurality of relay modes specifying combined time division and frequency division multiple wireless resource access in which each of an uplink channel and a downlink channel employ mutually exclusive frequency bands, and
a second relay mode and a third relay mode of the plurality of relay modes employ mutually exclusive frequency bands.

2. The mobile communication system of claim 1, wherein:
said plurality of relay modes respectively define wireless resources and times to be used when providing an access link from the mobile station to the relay node, and a relay link from the relay node to the base station.

3. The mobile communication system of claim 2, wherein:
said controller circuitry is further configured to set the selected relay mode to be one of:
the first relay mode, when the position information of the relay node indicates that the relay node is in the center region and the position information of the mobile station indicates that said mobile station is in the boundary region;
the second relay mode, when the position information of the relay node and the position information the mobile station indicate that both the relay node and the mobile station are in the boundary region; and
the third relay mode, when the position information of the relay mode and the position information of the mobile station indicate that both the relay node and the mobile station are in the center region, wherein
said transmitter when using said first wireless resources to cover said center region transmits at a lower power than when using second wireless resources to cover said boundary region.

4. The mobile communication system of claim 1, wherein said first relay mode employs at least one of a set of frequency and time combinations, said combinations comprising:
employing one of the mutually exclusive frequency bands for the uplink during a first time segment, and another of the mutually exclusive frequency bands for the downlink during a second time segment, said first time segment not overlapping with said second time segment;
employing said one of the mutually exclusive frequency bands for the uplink during said first time segment, and another of the mutually exclusive frequency bands for the downlink during the second time segment, said first time segment not overlapping with said second time segment; and
employing a first sub-band of said one of the mutually exclusive frequency bands for a relay link portion of the uplink and employing a first sub-band of said another of the mutually exclusive frequency bands for an access link portion of the uplink, and employing a second sub-band of said one of the mutually exclusive frequency bands for a relay link portion of the downlink and employing a second sub-band of said another of the mutually exclusive frequency bands for an access link portion of the downlink.

5. The mobile communication system of claim 1, further comprising:
a position determination mechanism configured to determine the position information of said relay node, said position determination mechanism being included in one of said relay node and said base station.

6. A relay node in a mobile communication system that provides wireless coverage in a cell of a base station, said cell being divided into a center region and a boundary region, said center region being surrounded by said boundary region, said relay node comprising:
a transceiver configured to relay signals between said base station and a mobile station; and
controller circuitry configure to operate said relay node in a selected relay mode chosen from a plurality of relay modes based on position information of the mobile station and position information of the relay node relative to the boundary region and the center region, each of the plurality of relay modes specifying predetermined wireless resource assignments for communications between the base station and the relay node, and between the relay node and the mobile station,
a first relay mode of the plurality of relay modes specifying combined time division and frequency division multiple wireless resource access in which each of an uplink channel and a downlink channel employ mutually exclusive frequency bands, and a second relay mode and a third relay mode of the plurality of relay modes employ mutually exclusive frequency bands.

7. The relay node of claim 6, wherein:
said plurality of relay modes respectively define wireless resources and times to be used when providing an access link from the mobile station to the relay node, and a relay link from the relay node to the base station.

8. The relay node of claim 6, wherein said first relay mode employs at least one of a set of frequency and time combinations, said combinations comprising:
employing one of the mutually exclusive frequency bands for the uplink during a first time segment, and another of the mutually exclusive frequency bands for the downlink during a second time segment, said first time segment not overlapping with said second time segment;
employing said one of the mutually exclusive frequency bands for the uplink during said first time segment, and another of the mutually exclusive frequency bands for the downlink during the second time segment, said first time segment not overlapping with said second time segment; and
employing a first sub-band of said one of the mutually exclusive frequency bands for a relay link portion of the uplink and employing a first sub-band of said another of the mutually exclusive frequency bands for an access link portion of the uplink, and employing a second sub-band of said one of the mutually exclusive frequency bands for a relay link portion of the downlink and employing a second sub-band of said another of the mutually exclusive frequency bands for an access link portion of the downlink.

9. A method for relaying wireless signals in a cell, said cell being divided into a center region and a boundary region, said center region being surrounded by said boundary region, an outer edge of said boundary region defining an outer edge of said cell, said method comprising:
transmitting, by processing circuitry, signals from a base station using wireless resources allocated to the center region and transmitting signals using wireless resources allocated to the boundary region,
relaying signals with a relay node between said base station and a mobile station, said relaying step including
selecting with a controller a relay mode from a plurality of relay modes based on position information of the mobile station and position information of the relay node, relative to the boundary region and the center region, each of the plurality of relay modes specifying predetermined wireless resource assignments for communications between the base station and the relay node, and between the relay node and the mobile station, wherein
a first relay mode of the plurality of relay modes specifying combined time division and frequency division multiple wireless resource access in which each of an uplink channel and a downlink channel employ mutually exclusive frequency bands, and
a second relay mode and a third relay mode of the plurality of relay modes employ mutually exclusive frequency bands.

10. The method of claim 9, wherein:
said plurality of relay modes respectively define wireless resources and times to be used when providing an access link from the mobile station to the relay node, and a relay link from the relay node to the base station.

11. The method of claim 10, wherein the controller operates the relay node in the selected relay mode, which is one of:

the first relay mode, when the position information of the relay node indicates that the relay node is in the center region and the position information of the mobile station indicates that said mobile station is in the boundary region;
the second relay mode, when the position information of the relay node and the position information the mobile station indicate that both the relay node and the mobile station are in the boundary region; and
the third relay mode, when the position information of the relay mode and the position information of the mobile station indicate that both the relay node and the mobile station are in the center region, wherein
said transmitter when using said first wireless resources to cover said center region transmits at a lower power than when using second wireless resources to cover said boundary region.

12. The method of claim 9, wherein said first relay mode employs at least one of a set of frequency and time combinations, said combinations comprising:
employing one of the mutually exclusive frequency bands for the uplink during a first time segment, and another of the mutually exclusive frequency bands for the downlink during a second time segment, said first time segment not overlapping with said second time segment;
employing said one of the mutually exclusive frequency bands for the uplink during said first time segment, and another of the mutually exclusive frequency bands for the downlink during the second time segment, said first time segment not overlapping with said second time segment; and
employing a first sub-band of said one of the mutually exclusive frequency bands for a relay link portion of the uplink and employing a first sub-band of said another of the mutually exclusive frequency bands for an access link portion of the uplink, and employing a second sub-band of said one of the mutually exclusive frequency bands for a relay link portion of the downlink and employing a second sub-band of said another of the mutually exclusive frequency bands for an access link portion of the downlink.

13. The method of claim 9, further comprising:
determining the position information of said relay node, said position determination mechanism being included in one of said relay node and said base station.

14. A mobile terminal for use in a mobile communication system that provides wireless coverage in a cell from a base station, said cell being divided into a center region and a boundary region, said center region being surrounded by said boundary region, said mobile terminal comprising:
a transceiver configured to exchange wireless signals with a base station via a relay node;
a non-transitory computer readable medium that holds scheduling information corresponding to a selected relay mode for said relay node; and
a controller configured to change which wireless resources are used in communications with said relay node based on the selected relay mode, said selected relay mode chosen from a plurality of relay modes based on position information of the mobile terminal and position information of the relay node, each of the plurality of relay modes specifying predetermined wireless resource assignments for communications between the base station and the relay node, and between the relay node and mobile terminal,
a first relay mode of the plurality of relay modes specifying combined time division and frequency division multiple wireless resource access in which each of an uplink channel and a downlink channel employ mutually exclusive frequency bands, and a second relay mode and a third relay mode of the plurality of relay modes use mutually exclusive frequency bands.

15. The mobile terminal of claim 14, wherein said controller is configured to selectably operate in one of said first relay mode, said second relay mode, and said third relay mode, said first relay mode being selected when the position information of the relay node indicates that the relay node is in the center region and the position information of the mobile station indicates that said mobile station is in the boundary region, said second relay mode being selected when the position information of the relay node and the position information the mobile station indicate that both the relay node and the mobile station are in the boundary region, and said third relay mode being selected when the position information of the relay mode and the position information of the mobile station indicate that both the relay node and the mobile station are in the center region.

16. A base station in a mobile communication system that provides wireless coverage in a cell, said cell being divided into a center region and a boundary region, said center region being surrounded by said boundary region, said base station comprising:

a transceiver configured to exchange signals with a mobile station via a relay node; and a controller that selects a relay mode from a plurality of relay modes based on position information of the mobile station and position information of the relay node relative to the boundary region and the center region, each of the plurality of relay modes specifying predetermined wireless resource assignments for communications between the base station and the relay node, and between the relay node and the mobile station, a first relay mode of the plurality of relay modes specifying combined time division and frequency division multiple wireless resource access in which each of an uplink channel and a downlink channel employ mutually exclusive frequency bands, and a second relay mode and a third relay mode of the plurality of relay modes use mutually exclusive frequency bands.

17. The base station of claim 16, wherein:

said plurality of relay modes respectively define wireless resources and times to be used when providing an access link from the mobile station to the relay node, and a relay link from the relay node to the base station.

* * * * *